(12) United States Patent
Palmer et al.

(10) Patent No.: US 12,548,987 B2
(45) Date of Patent: Feb. 10, 2026

(54) METHODS, SYSTEMS, AND APPARATUS FOR JUNCTION BOX ASSEMBLY

(71) Applicant: Snap One, LLC, Lehi, UT (US)

(72) Inventors: Matthew Thomas Palmer, Sandy, UT (US); Jason Alexander, Salt Lake City, UT (US)

(73) Assignee: Snap One, LLC, Lehi, UT (US)

( * ) Notice: Subject to any disclaimer, the term of this patent is extended or adjusted under 35 U.S.C. 154(b) by 245 days.

(21) Appl. No.: 18/242,644

(22) Filed: Sep. 6, 2023

(65) Prior Publication Data

US 2024/0243564 A1    Jul. 18, 2024

Related U.S. Application Data

(60) Provisional application No. 63/404,562, filed on Sep. 8, 2022.

(51) Int. Cl.
| | | |
|---|---|---|
| *H01H 13/02* | (2006.01) | |
| *H01H 13/10* | (2006.01) | |
| *H02G 3/08* | (2006.01) | |

(52) U.S. Cl.
CPC .......... *H02G 3/086* (2013.01); *H01H 13/023* (2013.01); *H01H 13/10* (2013.01)

(58) Field of Classification Search
CPC ...... H01H 13/023; H01H 13/10; H01H 13/02; H01H 21/025; H01H 21/22; H01H 2219/056; H01H 2219/062; H01H 2219/064; H01H 9/182; H02G 3/081; H02G 3/086; H02G 3/14; H02G 3/08
USPC .......................................................... 174/50
See application file for complete search history.

(56) References Cited

U.S. PATENT DOCUMENTS

| | | | | |
|---|---|---|---|---|
| 6,558,190 B1* | 5/2003 | Pierson, Jr. | ............ | H01R 9/226 439/535 |
| 6,761,468 B1* | 7/2004 | Bogal | ..................... | G09F 13/08 362/208 |
| 7,323,638 B1* | 1/2008 | Radosavljevic | ....... | H02G 3/086 174/53 |
| 8,405,615 B1* | 3/2013 | Williams | .............. | G06F 3/0216 361/679.14 |
| 2016/0380424 A1* | 12/2016 | Aromin | ................. | H01H 83/04 361/50 |

OTHER PUBLICATIONS

TayMac 1-Translucent Electrical Box Cover_Hubble_p. 1_Feb 2022.*

* cited by examiner

*Primary Examiner* — Timothy J Thompson
*Assistant Examiner* — Guillermo J Egoavil
(74) *Attorney, Agent, or Firm* — Greenberg Traurig, LLP; Nicholas Martin; David J. Dykeman

(57) ABSTRACT

Systems, methods, and apparatus for a junction box assembly are described. A junction box assembly can include or contain devices and components, such as any of the following: a junction box having an interior for containing any of devices and components included in the junction box assembly; a base plate having a central opening and a periphery attaching to the junction box; a grounding wire attached to the base plate; a device connected to the grounding wire and disposed in the central opening of the base plate; a button array having any number of buttons and attaching to the device; and a face plate disposed to attach to the base plate and to surround the button array.

10 Claims, 35 Drawing Sheets

SECTION B-B

SECTION D-D

SECTION G-G

SECTION H-H

SECTION J-J

SECTION K-K

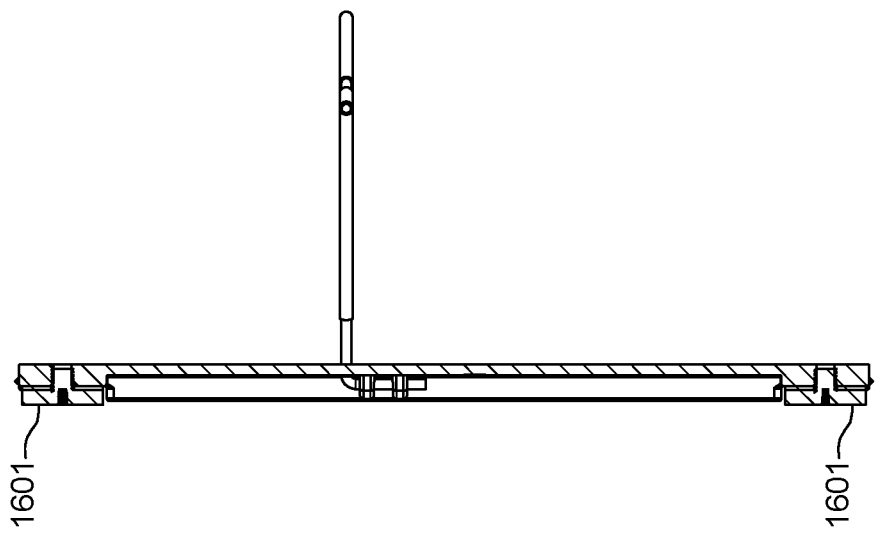
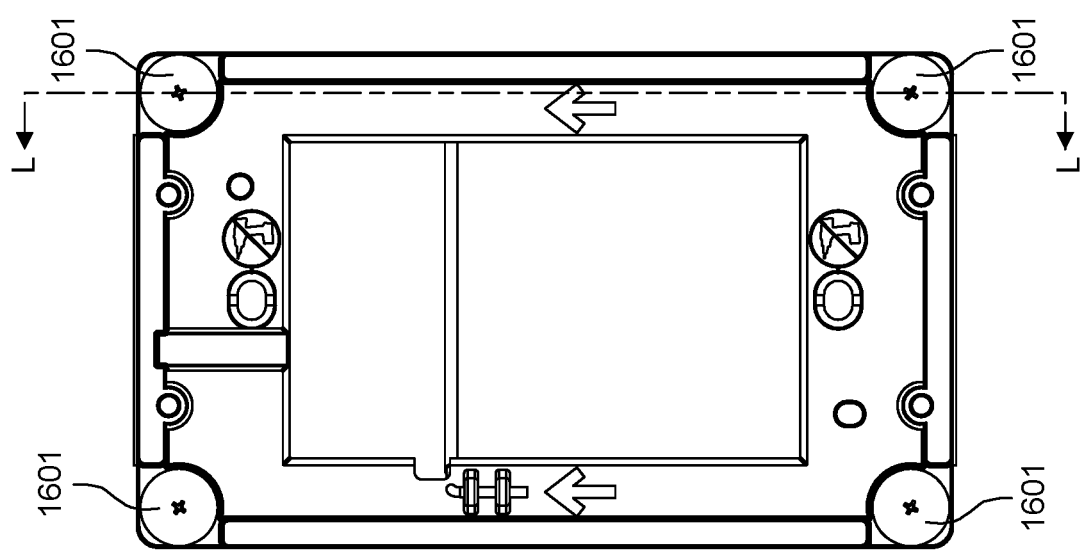
FIG. 16A
FIG. 16B
SECTION L-L

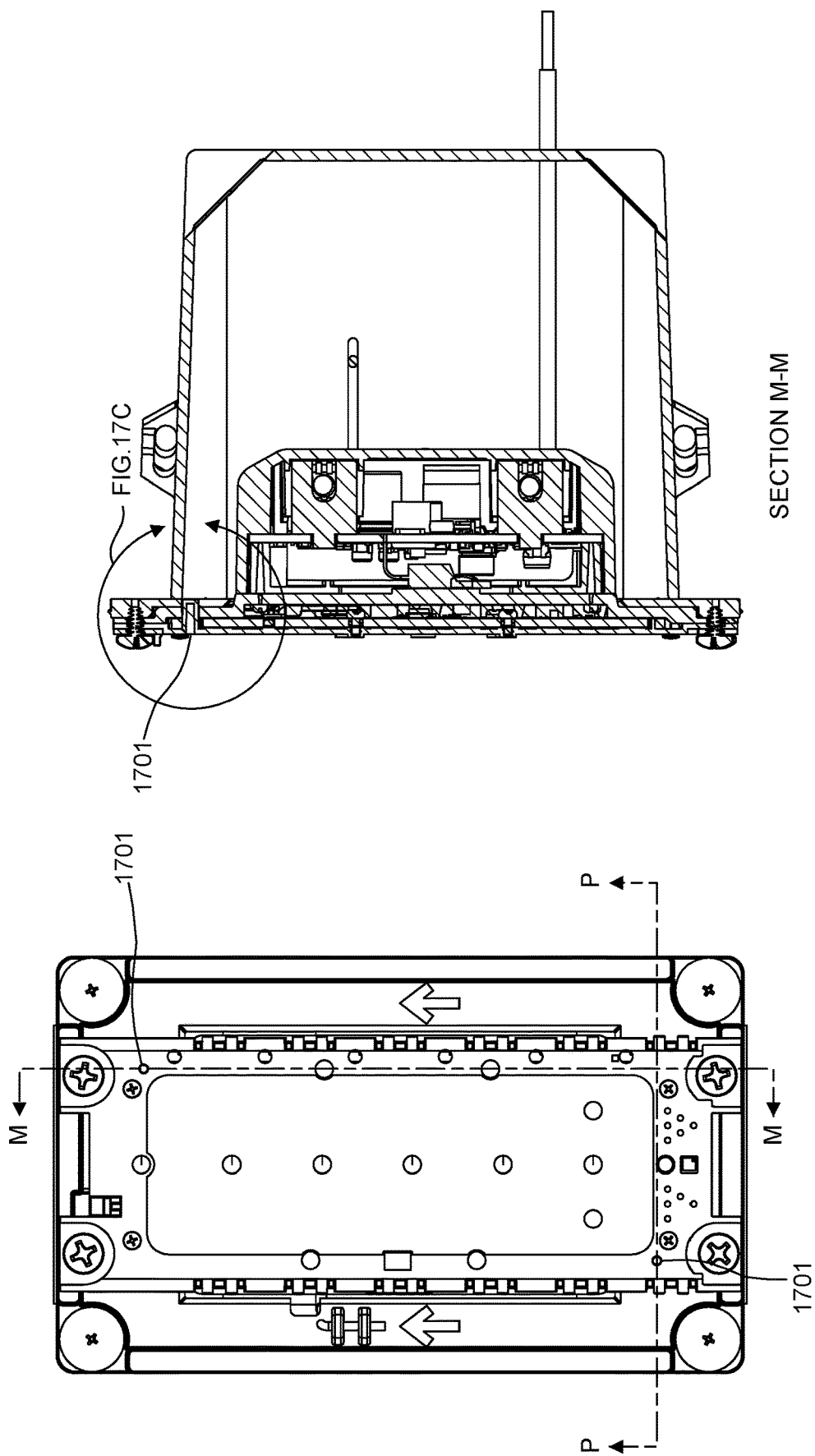

SECTION T-T

SECTION W-W

SECTION AC-AC

SECTION AG-AG

METHODS, SYSTEMS, AND APPARATUS FOR JUNCTION BOX ASSEMBLY

TECHNICAL FIELD

The present disclosure relates generally to structures and devices. More specifically, the present disclosure relates to a junction box assembly.

BACKGROUND

A junction box assembly (e.g., a gang box assembly), which may also be referred to and/or characterized/configured as any of an outlet junction box, a button junction box, a switch junction box, a dimmer junction box, a junction box, a gang box, a light switch, an electronic switch, a switch/etc., may installed in, disposed in, attached to, mounted to, built into, etc., an interior or exterior wall, for example, to provide a user (e.g., a home owner, a security guard, or any other type of person) access to buttons, switches, user inputs, control elements, etc., for controlling electrical devices that are connected to the junction box.

Conventional junction boxes are limited in many factors and/or considerations related to device installation, configuration, and use. That is, conventional junction boxes are difficult to install, for example, because of complexity in-wall components, such as the parts, pieces, elements, etc., that need to be installed in-wall for initial installation. Further, conventional junction boxes may be limited with respect to customization and replacement. For example, in a case where a homeowner chooses to change the color of outside-the-wall components so that they match a paint color of the wall on which the junction box is mounted, an entirety of a conventional junction box is removed from the wall so that another conventional junction box (e.g., having outside-the-wall components of a different color) is installed. Such replacement of conventional junction boxes is typically done by a technical professional such as an electrician, handyman, construction worker, smart-home integrator/technician, etc., for example, rather than, for example, outside-the-wall components the homeowner. Further, conventional junction boxes are limited, such as by drawbacks regarding any of user operation, user functionality, user aesthetic preferences, and durability.

BRIEF DESCRIPTION OF THE DRAWINGS

A detailed understanding may be had from the following description, presented by way of example in conjunction with the accompanying drawings, wherein:

FIG. 16A and FIG. 16B are diagrams illustrating a sub-plate steel screw, according to embodiments;

FIG. 17A is a diagram illustrating an alignment element, according to embodiments;

FIG. 17B is a diagram illustrating Section M-M of FIG. 17A;

DETAILED DESCRIPTION

Figure 1A:
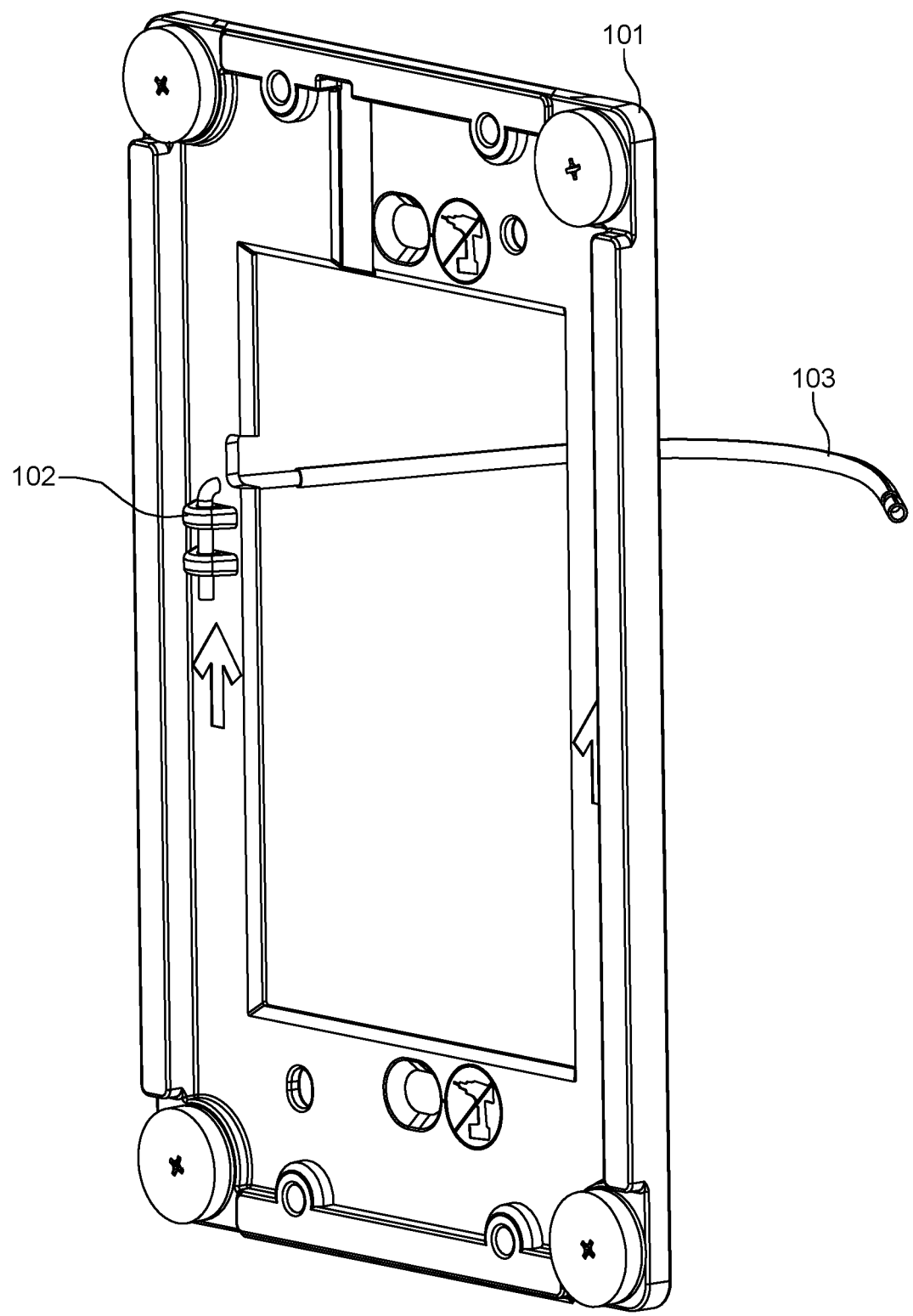
FIG. 1A is a diagram illustrating elements of a 1-gang junction box assembly, according to embodiments.

As referred to herein, a junction box assembly may be referred to, characterized, and/or configured as any of an outlet junction box, a button junction box, a switch junction box, a dimmer junction box, a junction box, an outlet, a gang box, a light switch, an electronic switch, a switch box, etc. According to embodiments, a junction box assembly may be any of installed in, disposed in, attached to, mounted to, built into, etc., an interior or exterior wall, for example, to provide a user (e.g., a home owner, a security guard, or any other type of person) access to buttons, switches, user inputs, control elements, etc., for example, for controlling electrical devices that are connected to the junction box. According to embodiments discussed herein, a junction box assembly may provide any of ease of installation, user configurability, durable mechanical action, aesthetic user experience, and/or any other similar benefits, features, characteristics, etc., associated with installation and use of a junction box.

For example, according to embodiments discussed herein, a junction box assembly may provide (e.g., and/or allow for) any of case of installation as performed by a technical professional, user configurability and/or customization performed by a typical homeowner and/or a technical professional, durable mechanical action for any of buttons, switches, sliders, user inputs, etc., aesthetic user experience including any of form factor, color, texture, air gaps between parts and/or components, backlight bleed, etc., and/or any other features, components, parts, characteristics, elements, etc., that address the above noted factors and/or considerations of a junction box assembly.

According to embodiments, although the disclosure herein is not limited to such, there may be the following use cases. In a case of installing (e.g., by a technical professional), a junction box assembly according to embodiments described herein may provide a reduction in time, complexity, steps, cost, expertise, etc., for installation of the junction box assembly. In a case of a person using, operating, viewing, configuring, etc., the junction box assembly, according to embodiments described and/or discussed herein, may provide a reduction in time, complexity, steps, cost, expertise, etc., for such person. In a case of any of retailing, manufacturing, stocking, warehousing, installing, etc., a junction box assembly, according to embodiments described herein, may provide a reduction in time, complexity, steps, cost, expertise, etc., for such case (e.g., less stock items, SKUs, etc.).

Embodiments discussed herein, referring to FIG. 1A through FIG. 25, may have any of the following features: (1) a grounding wire attached to a metal base plate; (2) a back box wire terminal providing isolation between a printed circuit board (PCB) and wires; (3) a back lighting diffusion element; (4) back lighting (which may be interchangeably referred to as backlighting); (5) light blocking foam; (6) a light blocking horn; (7) an electro-static discharge (ESD) shield; (8) a face plate mounting magnet; (9) a mounted indicator light emitting diode (LED); (10) a separate indicator LED; (11) an indicator light pipe; (12) a light pipe having multiple sections; (13) an ambient light pipe; (14) an air gap switch; (15) a base plate steel screw; (16) an alignment element; (17) a button having a rear pivot; (18) a button having corner and/or multiple pivots; (19) a face plate having an adjustable height; (20) a magnetic face plate; (21) button configurability; (22) center engraving for buttons; and (23) large buttons.

Figure 1B:
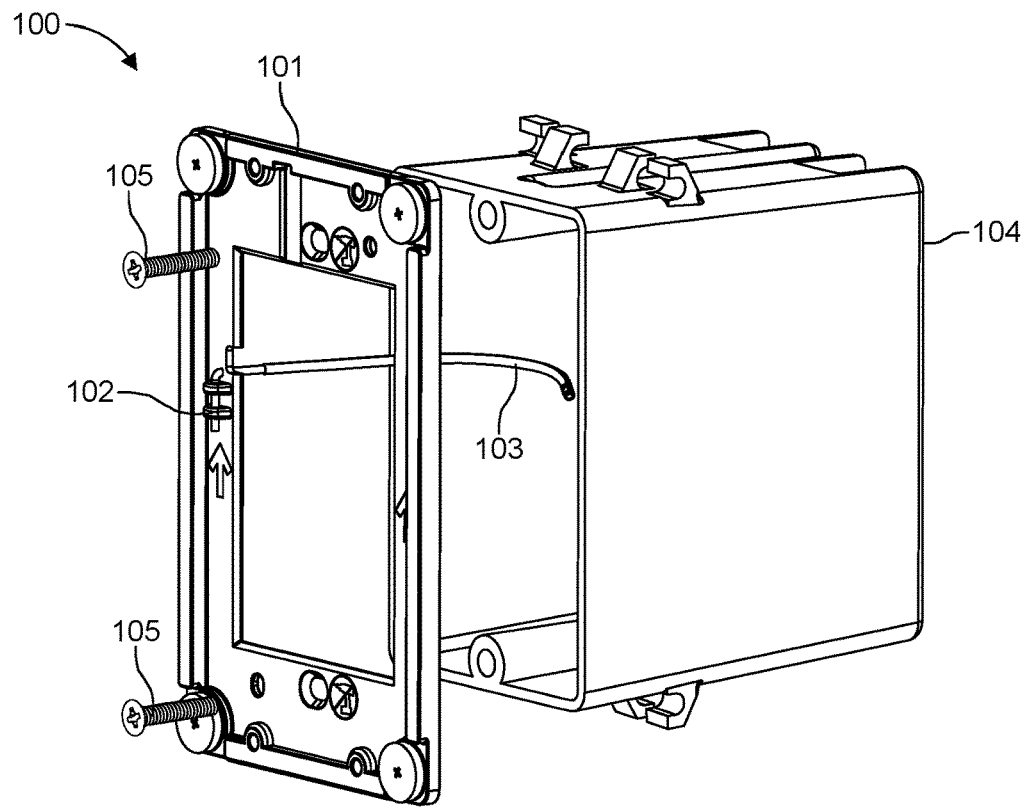
FIG. 1B and FIG. 1C are diagrams illustrating assembly of elements of a 1-gang junction box assembly, according to embodiments.
Figure 1C:
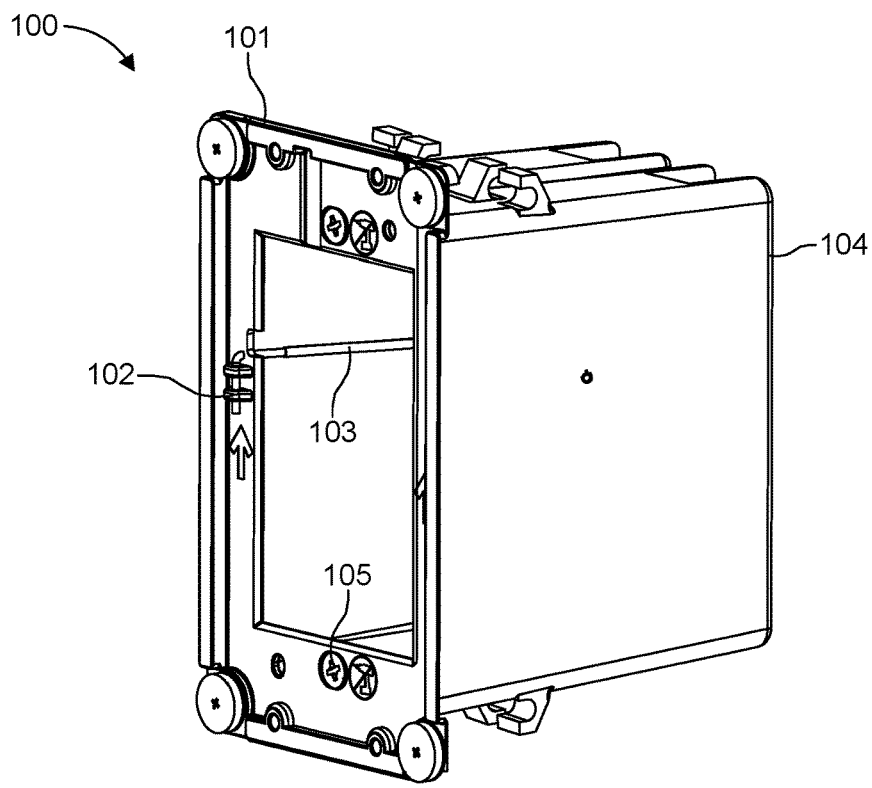
Figure 2A:
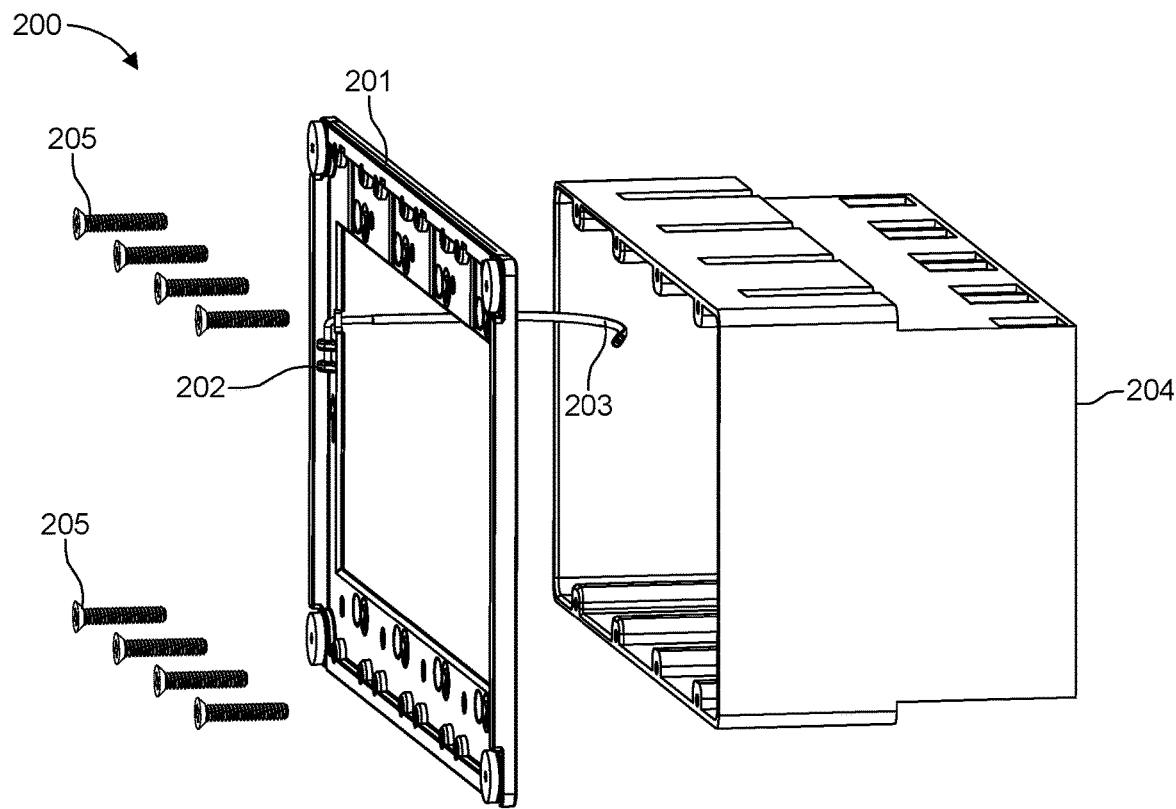
FIG. 2A is a diagram illustrating elements of a 4-gang junction box assembly, according to embodiments.
Figure 2B:
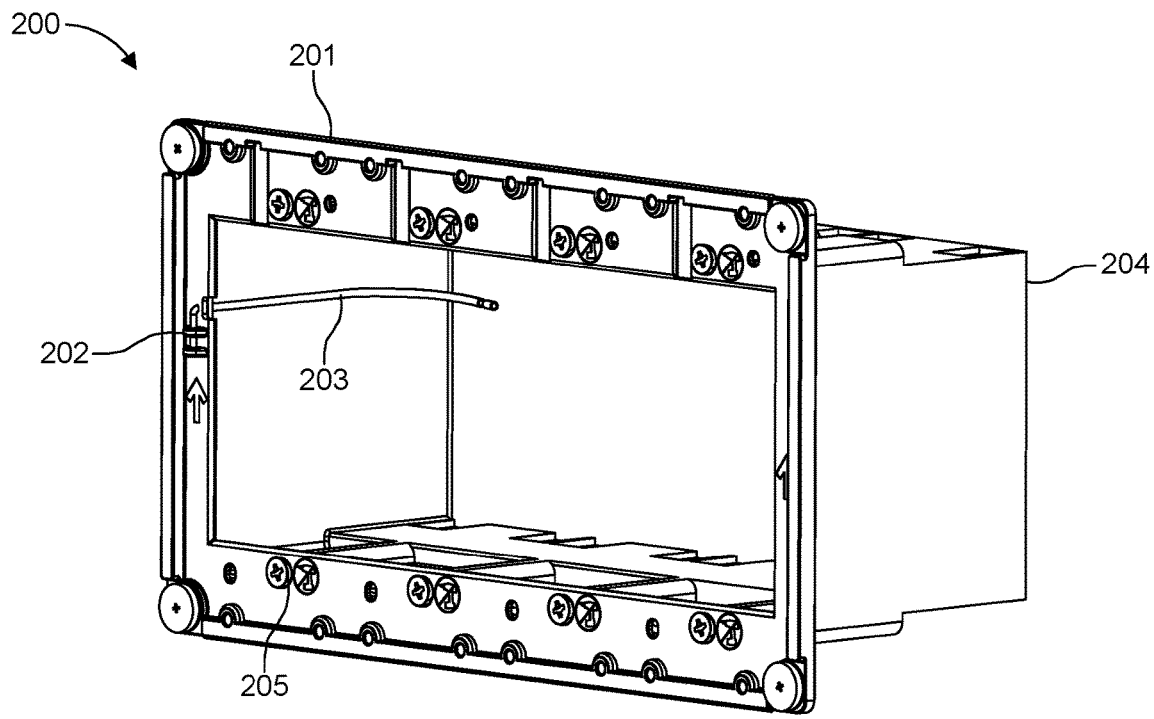
FIG. 2B is a diagram illustrating assembly of elements of a 4-gang junction box assembly, according to embodiments.

FIG. 1A is a diagram illustrating elements of a 1-gang junction box assembly, including a metal base plate and a grounding wire, according to embodiments. FIG. 1B is a diagram illustrating elements, and assembly thereof, of a 1-gang junction box assembly, according to embodiments. FIG. 1C is a diagram illustrating assembly of elements of a 1-gang junction box assembly, according to embodiments. FIG. 2A is a diagram illustrating elements of a 4-gang junction box assembly, according to embodiments. FIG. 2B is a diagram illustrating assembly of elements of a 4-gang junction box assembly, according to embodiments.

According to embodiments, referring to FIG. 1A through FIG. 1C, a junction box assembly 100 may include any of a metal base plate 101, a grounding wire 103, a junction box 104 and plate screws 105. According to embodiments, plate screws 105 may be for attaching the metal base plate 101 to the junction box 104. According to embodiments, any suitable and/or similar element for attaching the metal base plate 101 to the junction box 104 may be used in place of the plate screws 105. According to embodiments, a metal base plate (which may be interchangeable referred to as a base plate) 101 may have an attachment feature 102 for attaching a grounding wire 103 to the base plate 101.

That is, according to embodiments, a junction box assembly 100 may include a grounded base plate by having a metal base plate 101 attached to a grounding wire 103. According to embodiments, the metal base plate 101 may be tied to earth ground (e.g., only) through the metal base plate 101 (which may also be interchangeably referred to as a sub-plate). According to embodiments, in such a case of the metal base plate 101 being tied (e.g., connected, attached, etc.) to the earth ground, there may be no need for the earth ground to be tied through all devices (e.g., device 306 of FIG. 3A, devices 406 of FIG. 4A) included in a junction box assembly. According to embodiments, such grounded base plate (e.g., metal base plate 101) may have metal contact with (e.g., connection to) each device included in the junction box assembly 100. In such a case, the included devices may be to ground via metal-to-metal contact with the base plate. According to embodiments, there may be multiple methods of making contact between a device and the base plate 101.

Referring to FIGS. 2A and 2B, a 4-gang junction box assembly 200 may be similar to the 1-gang junction box assembly 100 as shown in FIGS. 1A and 1B. That is, according to embodiments a 4-gang junction box assembly 200 may include a base plate 201 having an attachment feature 202, a grounding wire 203, a junction box 204, and plate screws 205. According to embodiments, the base plate 202 may have a larger size (e.g., width) for accommodating more devices, that is for a 4-gang junction box 204. Furthermore, the embodiments described herein are not limited to a 1-gang or 4-gang junction boxes, and may be for any size junction box (e.g., 2-gang, 3-gang, 5-gang, etc.).

Figure 3A:
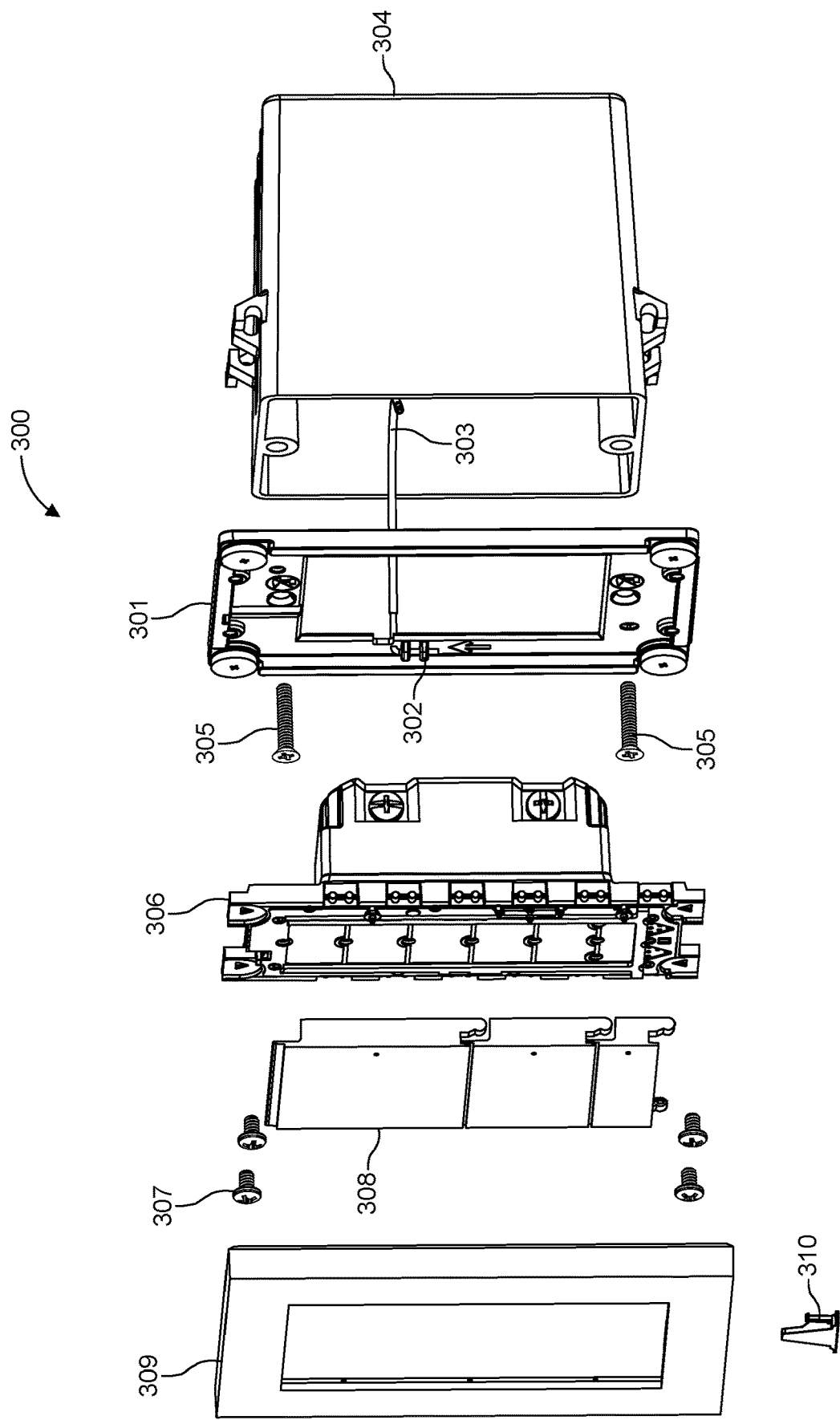
FIG. 3A is a diagram illustrating elements of a complete 1-gang junction box assembly, according to embodiments.
Figure 3B:
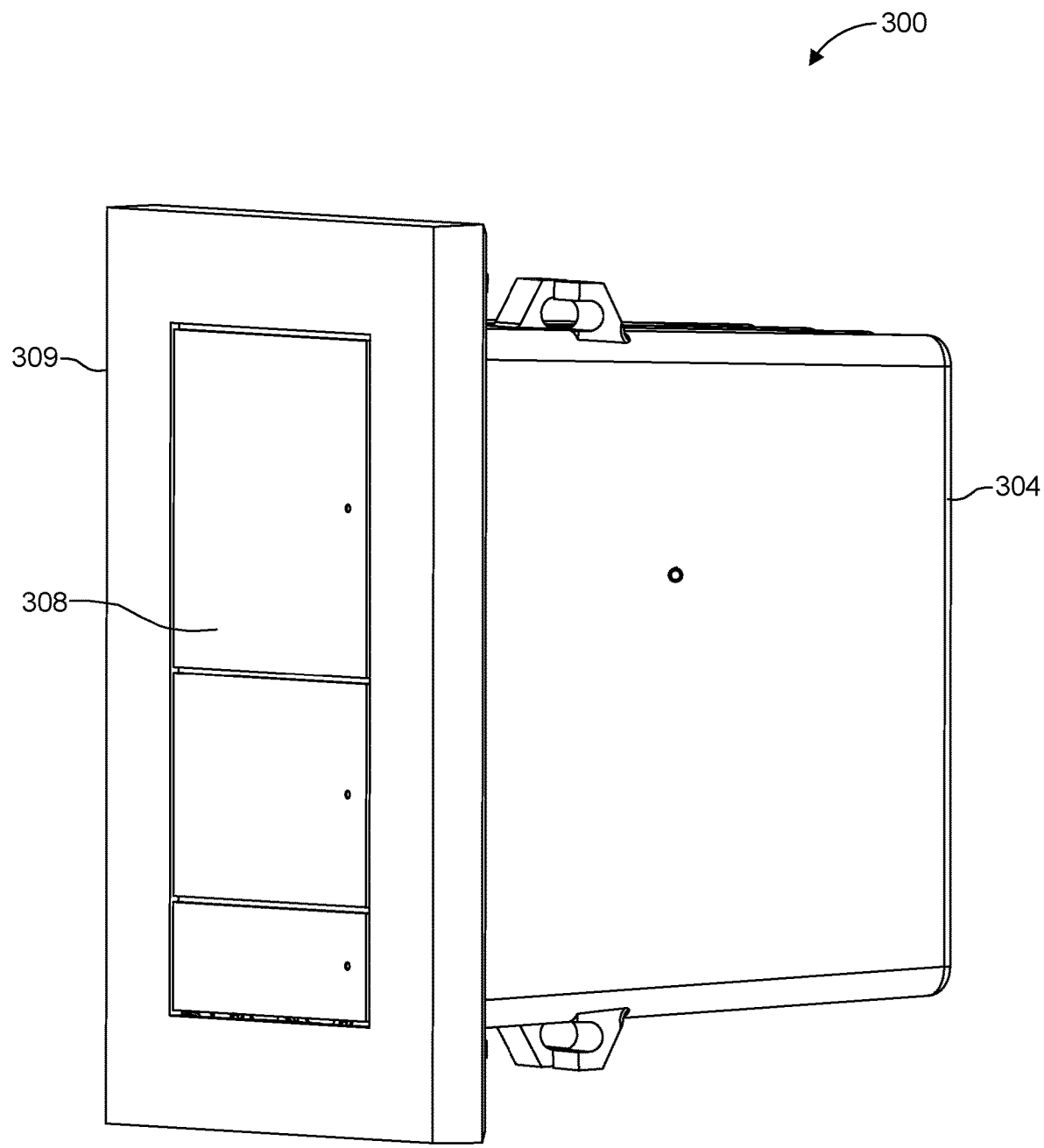
FIG. 3B is a diagram illustrating completed assembly of a 1-gang junction box assembly, according to embodiments.
Figure 4A:
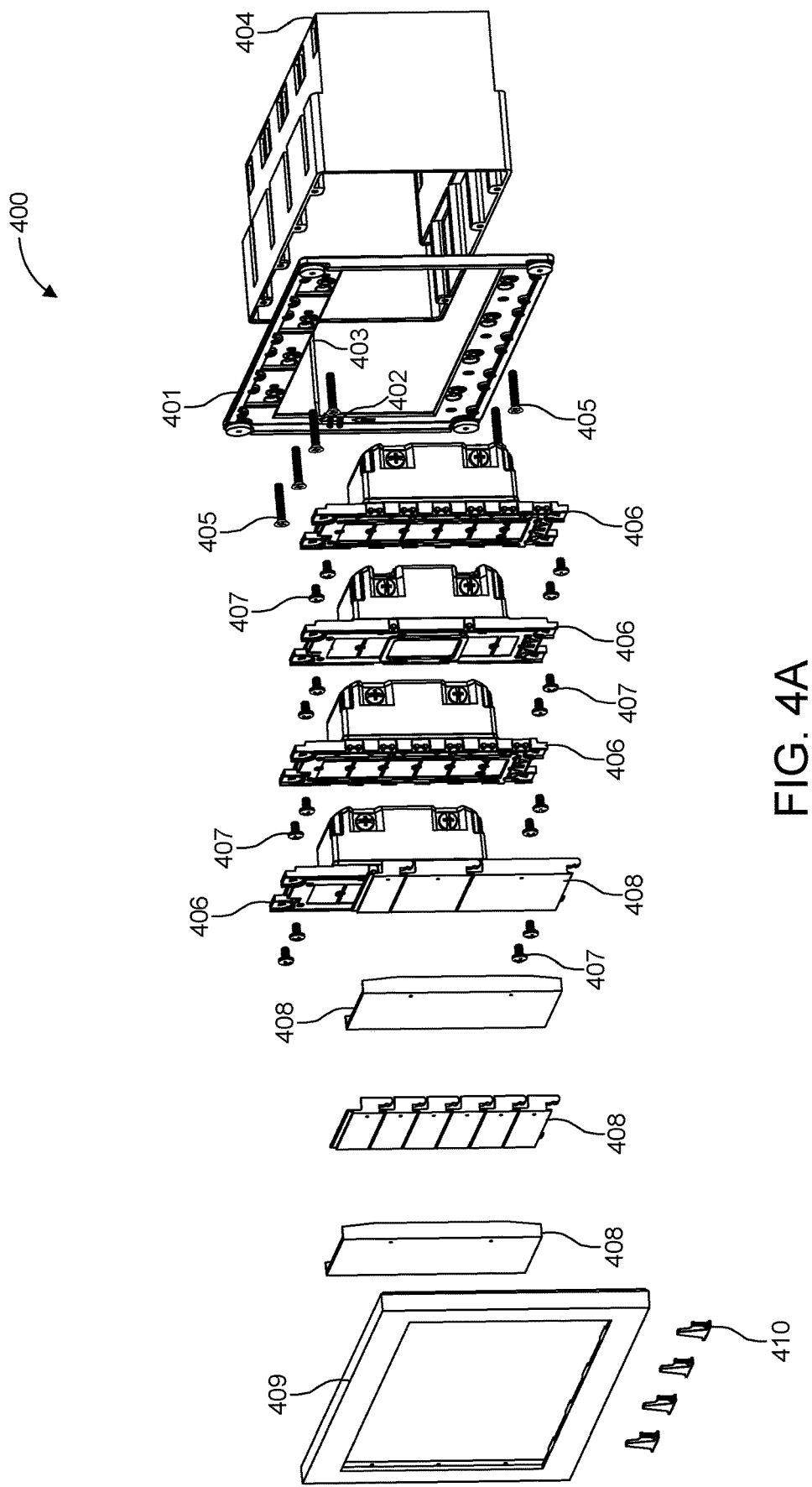
FIG. 4A is a diagram illustrating elements of a complete 4-gang junction box assembly, according to embodiments.

FIG. 3A is a diagram illustrating elements of a complete 1-gang junction box assembly, according to embodiments. FIG. 3B is a diagram illustrating completed assembly of a 1-gang junction box assembly, according to embodiments. FIG. 4A is a diagram illustrating elements of a complete 4-gang junction box assembly, according to embodiments.

Figure 4B:
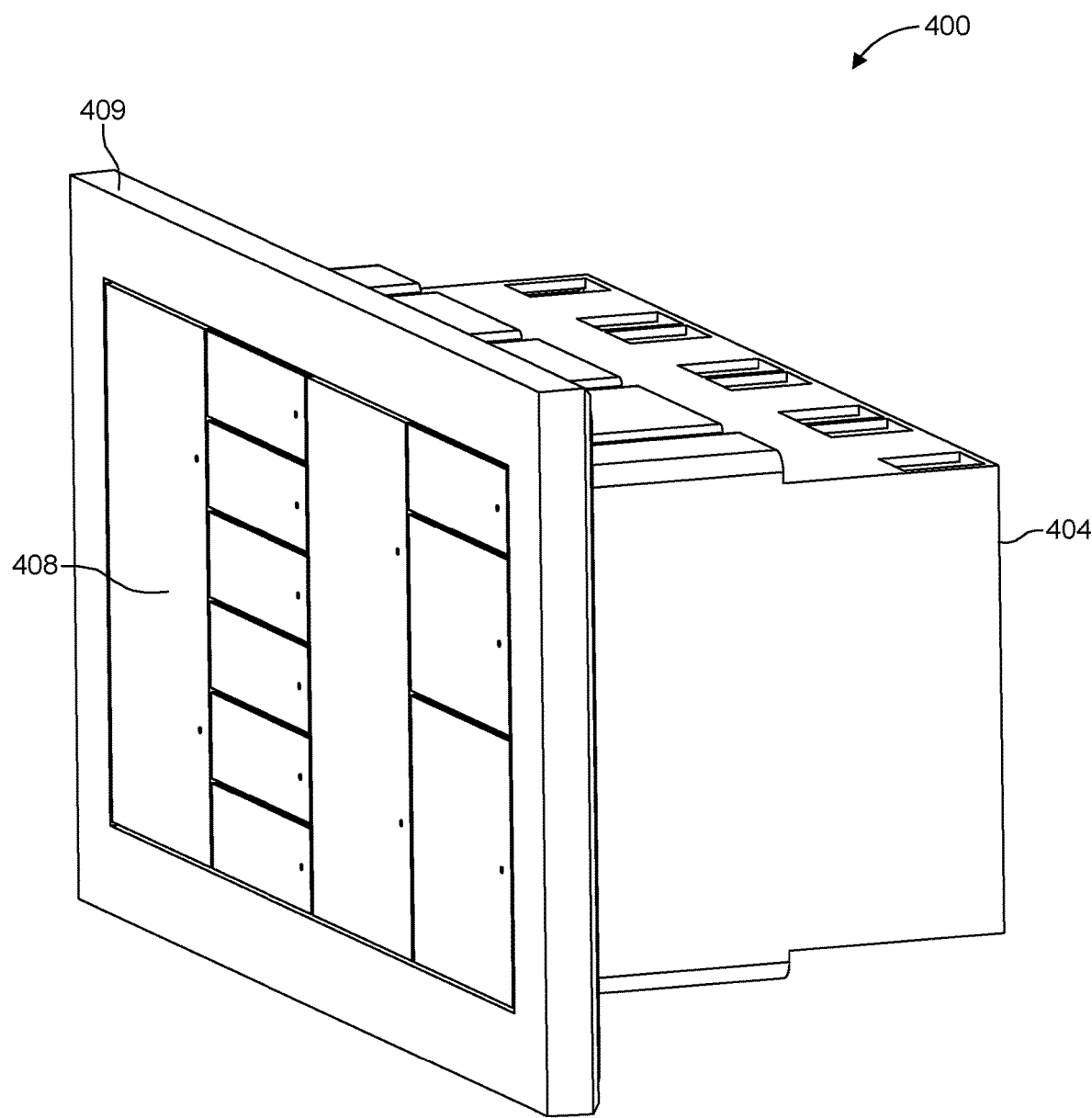
FIG. 4B is a diagram illustrating completed assembly of a 4-gang junction box assembly, according to embodiments.

FIG. 4B is a diagram illustrating completed assembly of a 4-gang junction box assembly, according to embodiments.

Referring to FIG. 3A and FIG. 3B, elements of a complete 1-gang junction box assembly 300 may include any of (e.g., metal) base plate 301 including attachment feature 302, grounding wire 303, junction box 304, plate screws 305, device 306, device screws 307, button array 308, face plate 309, and ambient light pipe 310. According to embodiments device 306 may be any of a switch device, a dimming device, a control device, a user input device, a control button device, etc. Referring to FIG. 4A and FIG. 4B, elements of a complete 4-gang junction box assembly 400 may include any of (e.g., metal) base plate 401 including attachment feature 402, grounding wire 403, junction box 404, plate screws 405, devices 406, device screws 407, button arrays 408, face plate 409, and ambient light pipe 410. According to embodiments device 306 may be any of a switch device, a dimming device, a control device, a user input device, a control button device, etc.

Figure 5A:
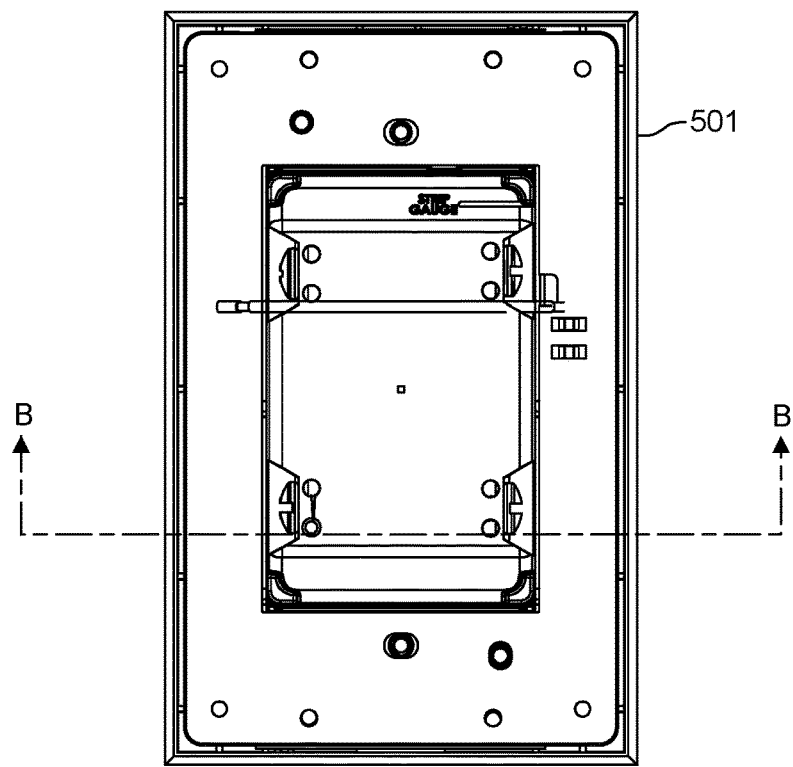
FIG. 5A is a diagram illustrating a back box wire terminal of a junction box assembly, according to embodiments.
Figure 5B:
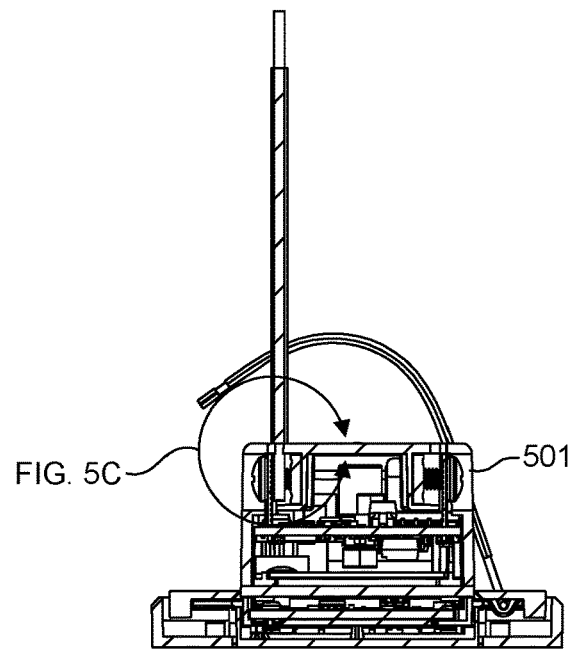
FIG. 5B is a diagram illustrating Section B-B of FIG. 5A.
Figure 5C:
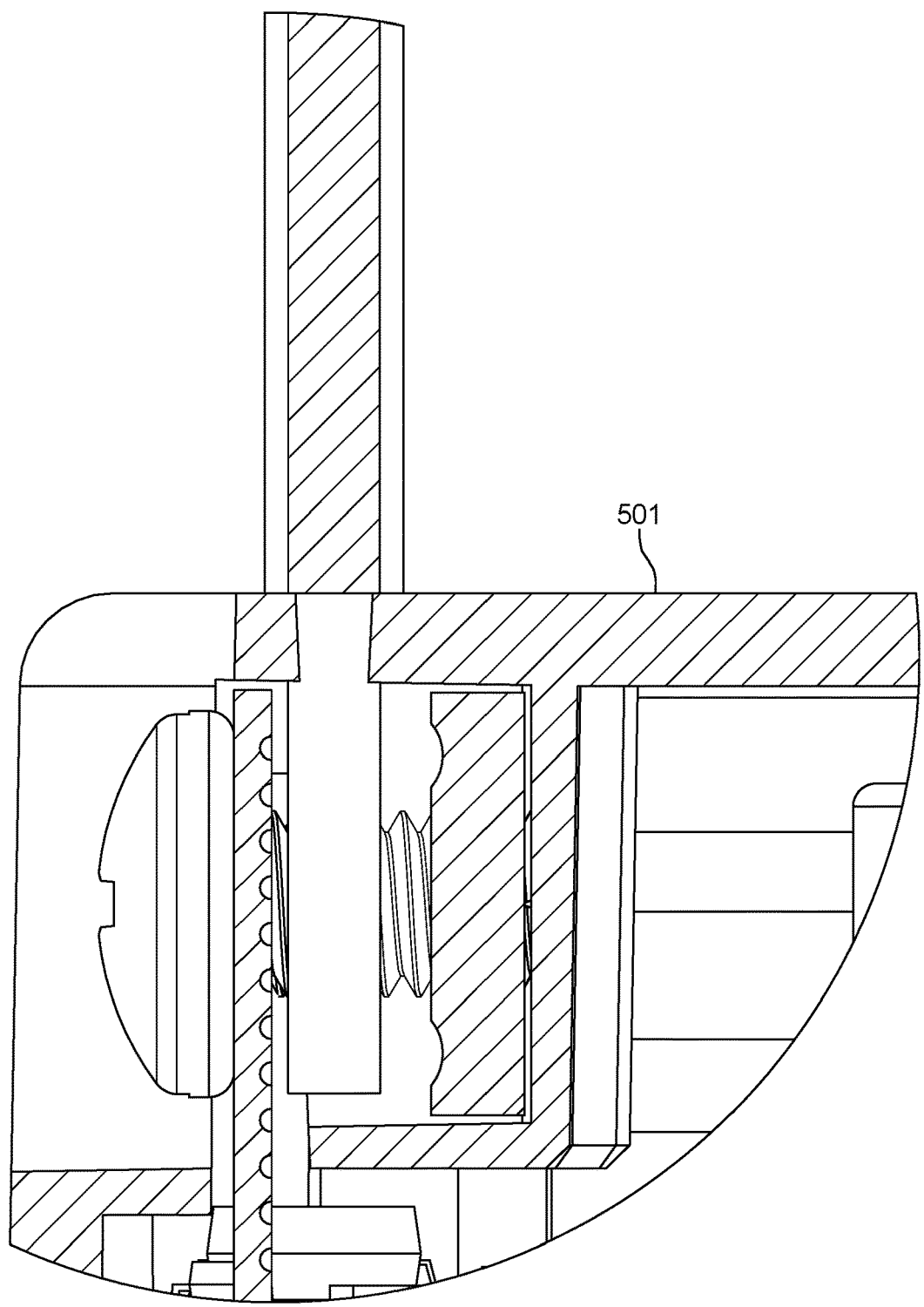
FIG. 5C is a diagram illustrating Detail C of FIG. 5B.
Figure 6A:
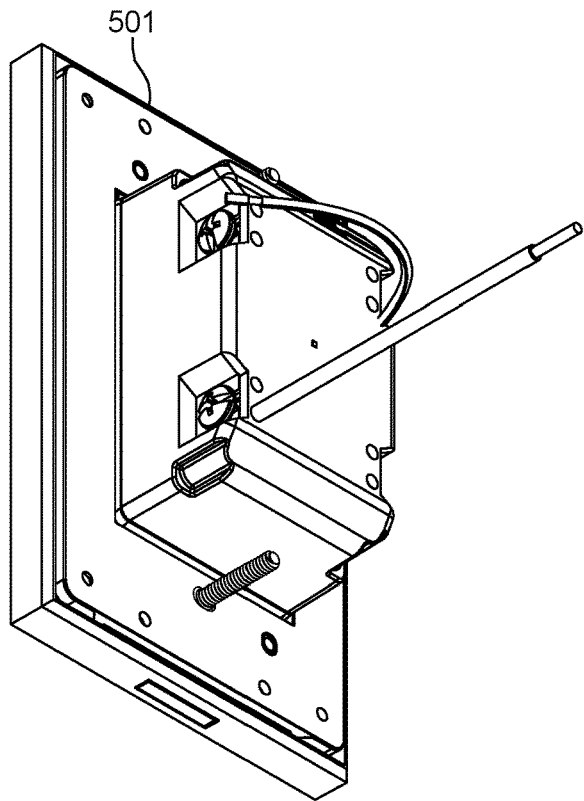
FIG. 6A is a diagram illustrating a view of a back box wire terminal, according to embodiments.
Figure 6B:
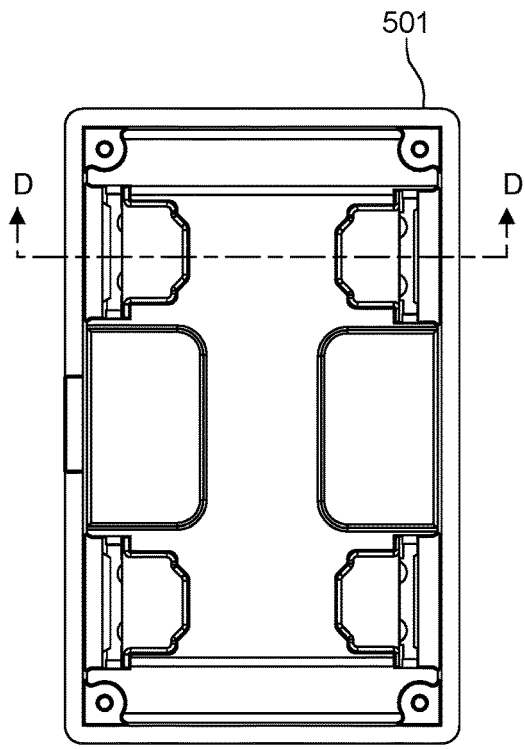
FIG. 6B is a diagram illustrating another view of a back box wire terminal, according to embodiments.
Figure 6C:
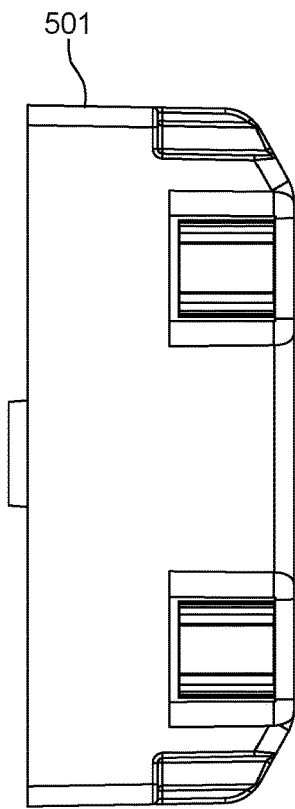
FIG. 6C is a diagram illustrating yet another view of a back box wire terminal, according to embodiments.
Figure 6D:
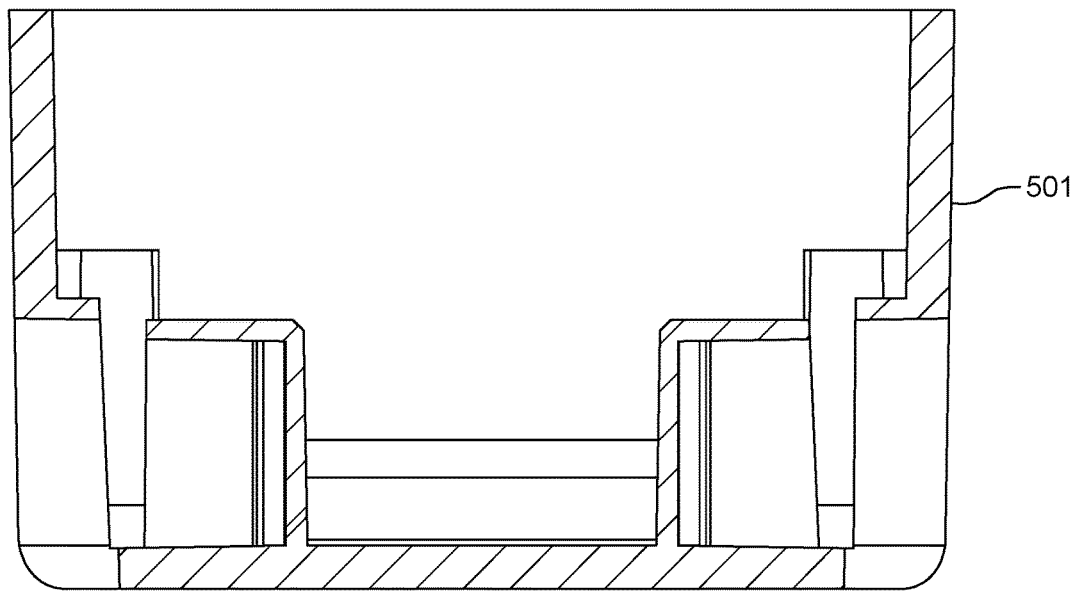
FIG. 6D is a diagram illustrating Section D-D of FIG. 6B.

FIG. 5A is a diagram illustrating a back box wire terminal of a junction box assembly, according to embodiments. FIG. 5B is a diagram illustrating Section B-B of FIG. 5A. FIG. 5C is a diagram illustrating Detail C of FIG. 5B. FIG. 6A is a diagram illustrating a view of a back box wire terminal, according to embodiments. FIG. 6B is a diagram illustrating another view of a back box wire terminal, according to embodiments. FIG. 6C is a diagram illustrating yet another view of a back box wire terminal, according to embodiments. FIG. 6D is a diagram illustrating Section D-D of FIG. 6B.

According to embodiments, a junction box assembly may include a back box wire terminal 501, for example, for enclosing and/or isolating (e.g., inserted romex) wire from internal circuitry (e.g., that is also inserted into the junction box). According to embodiments, in a case of a back box wire terminal 501, a design may allow for a (e.g., fully populated) printed circuit board (PCB) to be disposed (e.g., just) above incoming romex wire. In such a case, according to embodiments, plastic (e.g., of the back box wire terminal) may (e.g., completely) enclose and/or isolate the incoming romex wire, for example, so that it may not contact the internal PCB. According to embodiments, a back box wire terminal 501 may be molded it into a single part.

Figure 7A:
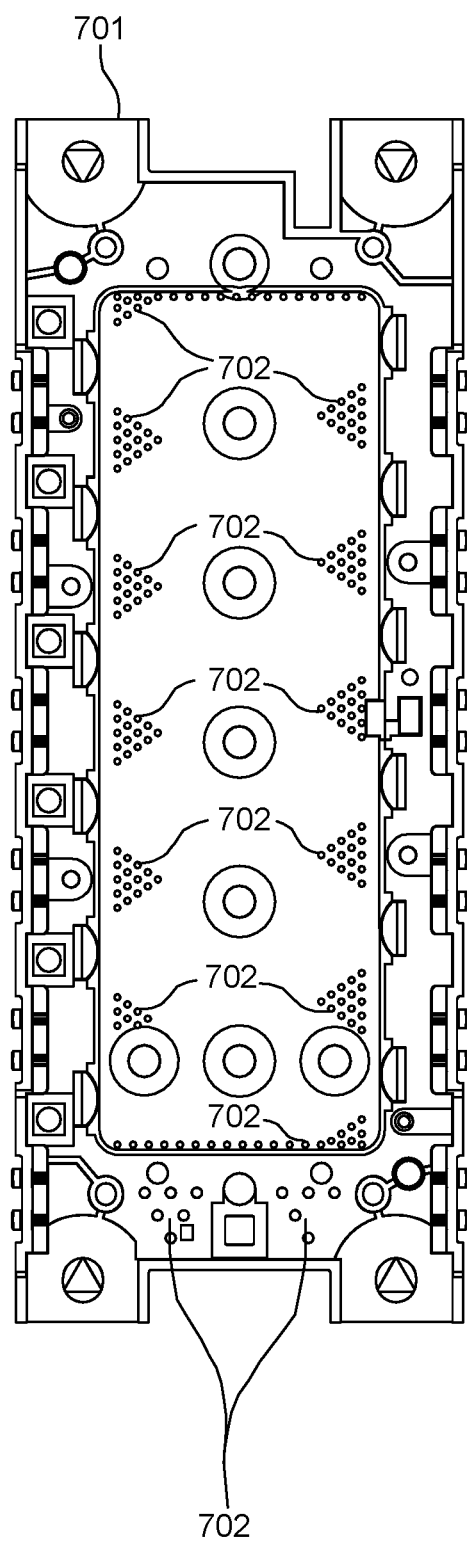
FIG. 7A is a diagram illustrating a back lighting diffusion element, according to embodiments.
Figure 7B:
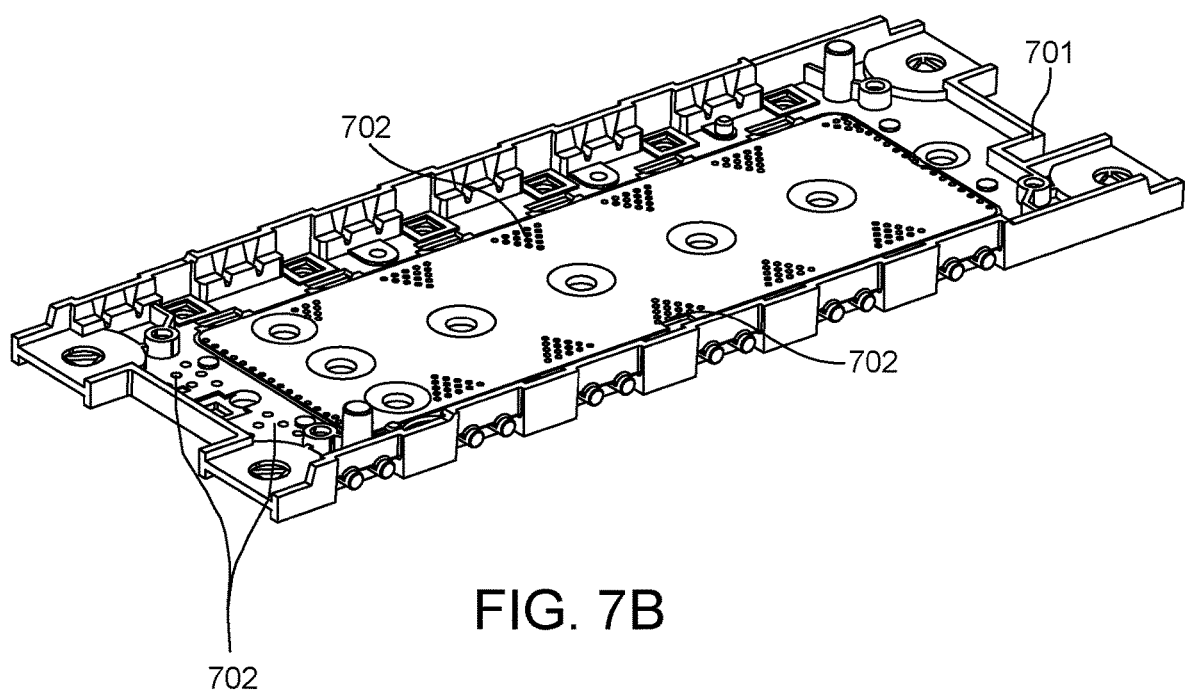
FIG. 7B and FIG. 7C are diagrams respectively illustrating a top view and a bottom view of a back lighting diffusion element, according to embodiments.
Figure 7C:
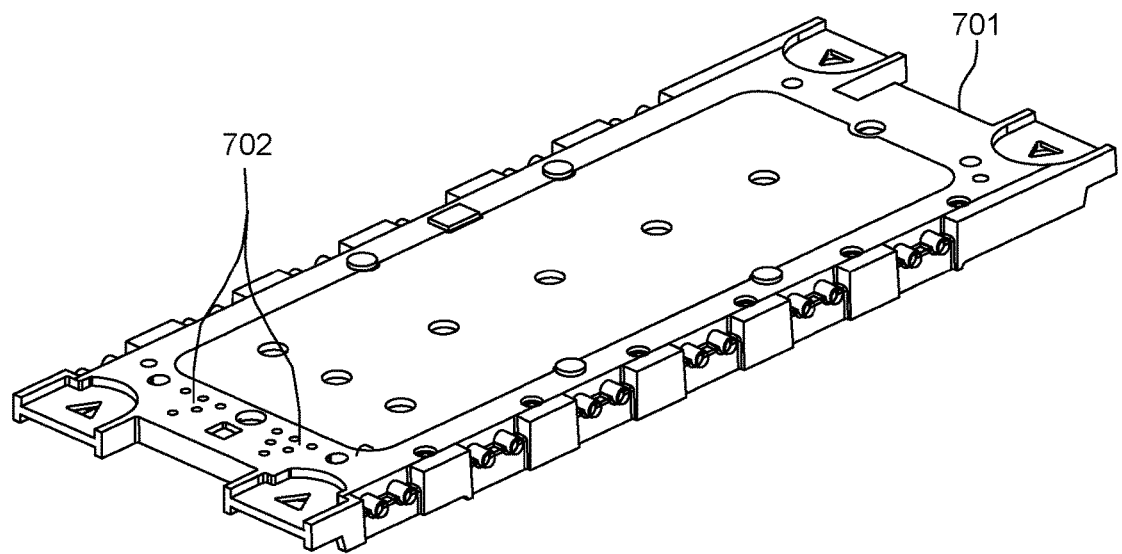
Figure 8A:
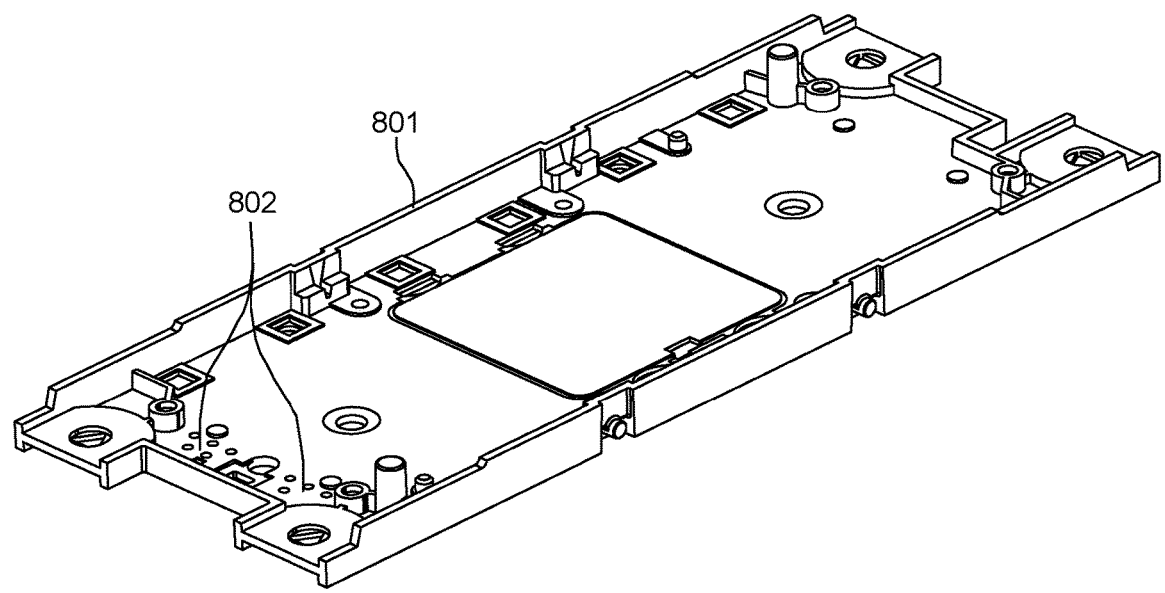
FIG. 8A and FIG. 8B are diagrams respectively illustrating top view and a bottom view of another back lighting diffusion element, according to embodiments.
Figure 8B:
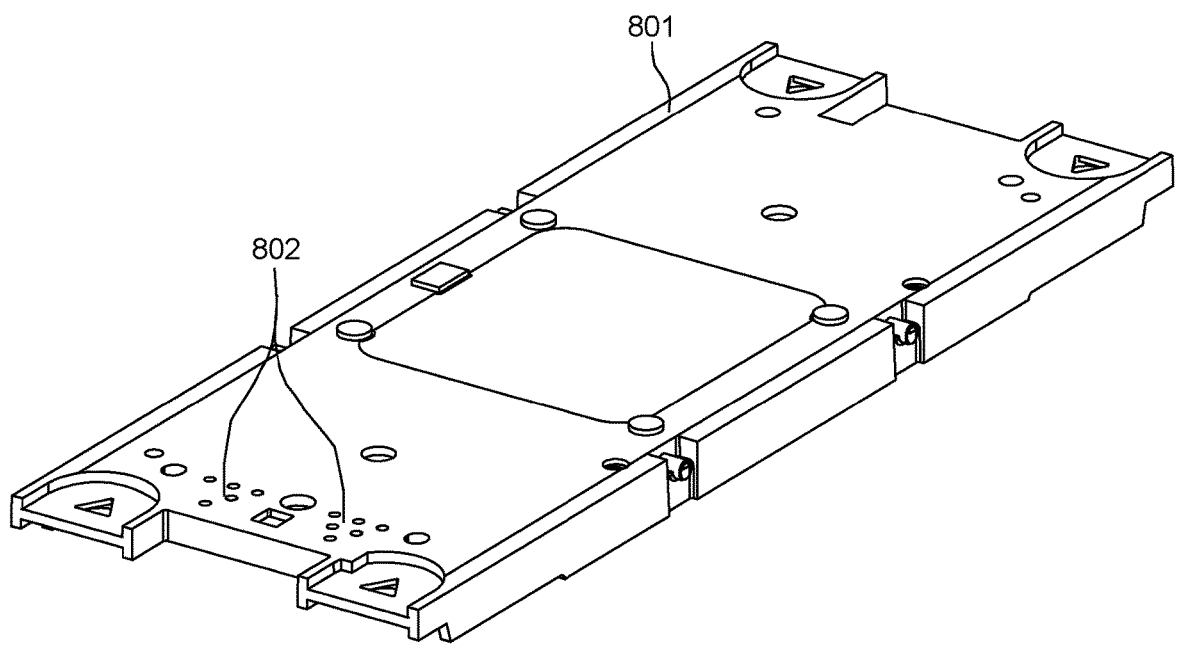

FIG. 7A is a diagram illustrating a back lighting diffusion element, according to embodiments. FIG. 7B and FIG. 7C are diagrams respectively illustrating a top view and a bottom view of a back lighting diffusion element, according to embodiments. FIG. 8A and FIG. 8B are diagrams respectively illustrating top view and a bottom view of another back lighting diffusion element, according to embodiments.

According to embodiments, a junction box assembly may include features for (e.g., performing, providing, etc.) back light diffusion. According to embodiments, a back lighting diffusion element 702, 802 may be included in a junction box, for example, to provide diffusion of light in and/or around the junction box. Conventionally back lighting diffusion can be achieved using a halftone dot pattern that is applied (e.g., silkscreen or laser marked) to a part or area of a conventional junction box. According to embodiments, a back lighting diffusion element 702, 802 may be a molding feature (e.g., a molded element, a mold characteristic, etc.) of any part and/or area(s) of a junction box assembly, such as a molding feature of a button base 701, 801 as shown in FIGS. 7A and 8A. However, the present disclosure is not limited thereto, and a back lighting diffusion element 702, 802 may be a molding feature included in any part, element, and/or area of a junction box assembly. Further, according to embodiments, a back lighting diffusion element 702, 802 may be an area of a part that may be have any degree (e.g., complete, partial, etc.) of opaqueness, for example, without being a molding features.

According to embodiments, a back light diffusion element 702, 802 included in a junction box assembly (e.g., in or on parts and/or elements included therein) may have a molding including a scoring 702, 802 (e.g., a v-shaped scoring, circular-dot scoring, and/or any other suitable and/or similar scoring) pattern, for example, for diffusing (e.g., that may diffuse) light using molded features. According to embodiments, a junction box may include a button base 701, 801. According to embodiments, a button base may be (e.g., function as, molded as, etc.) a structural component that is also a light pipe component. That is, according to embodiments, a button base 701, 801 may be molded as one element (e.g., simultaneously) providing: (1) a light pipe feature for guiding light; and (2) a button base for a button (e.g., a button array). In such case of the button base 701, 801 providing light pipe features, there may be no need or use for a (e.g., separate, clear) plastic light diffuser.

According to embodiments, a junction box assembly may include features for (e.g., performing, providing, etc.) backlighting of a button, which may also be referred to as a backlit button. According to embodiments, a backlit button may have a molding process including more than one shot (e.g., application) of mold, for example, in order to mold the backlit button using two shots of mold (e.g., a two-shot molding process, procedure, technique, etc.). According to embodiments, a 2-shot molding technique may be (e.g., used, unique, configured, etc.) for isolating light transfer to a (e.g., specific) location on and/or area of a button. In other words, according to embodiments, the button may be formed using two different shots of mold, one shot of mold being a transparent material and the other shot of mold being an opaque material. That is, according to embodiments, a part of a button may be opaque, for example, to block unwanted light.

According to embodiments, a junction box assembly may include (although not shown) light blocking foam, for example, attached to buttons for light blocking. That is, according to embodiments of junction box features discussed herein, a (e.g., small) piece of light blocking foam may be adhered to the front of an ESD shield to block light between the buttons, for example, according to a configuration of a junction box and/or its features, as discussed herein.

Figure 9A:
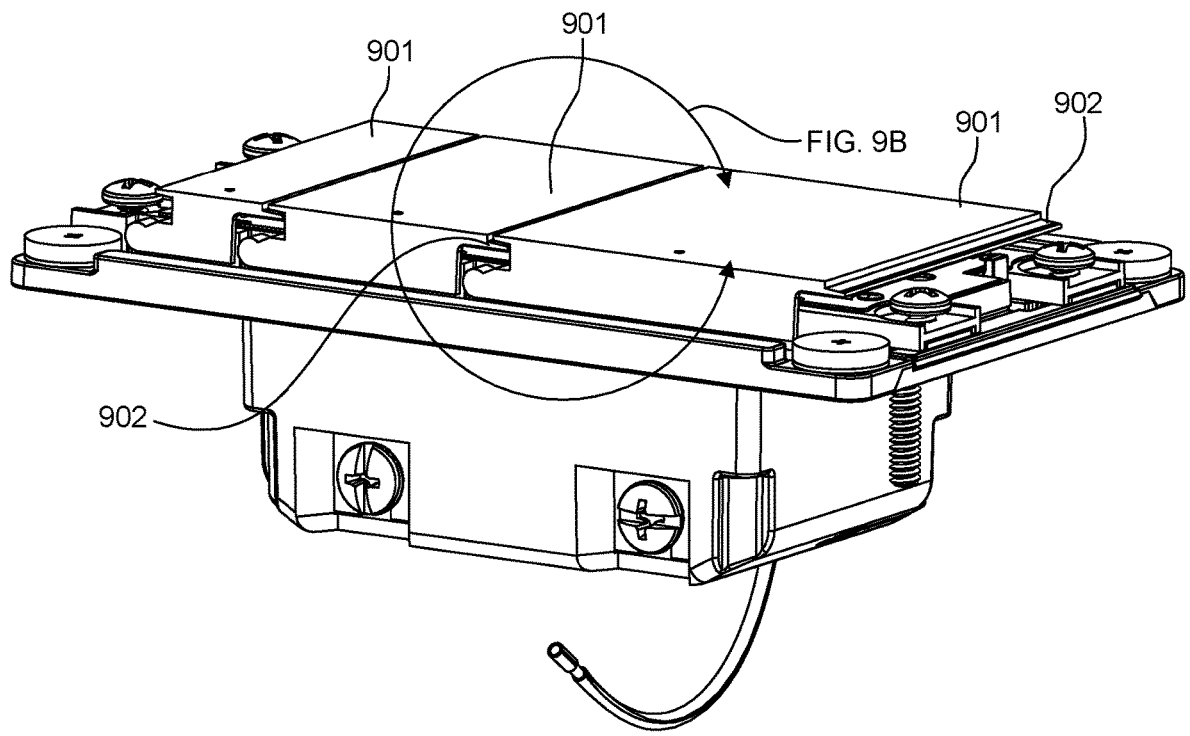
FIG. 9A and FIG. 9B are diagrams illustrating a device button including a light blocking horn, according to embodiments.
Figure 9B:
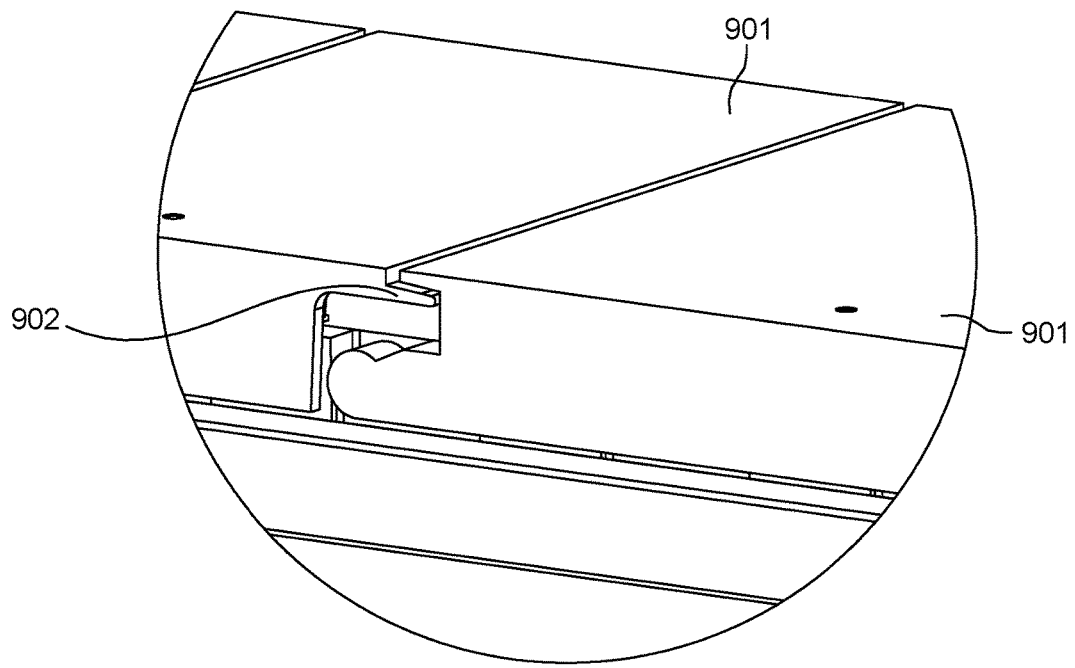
Figure 10A:
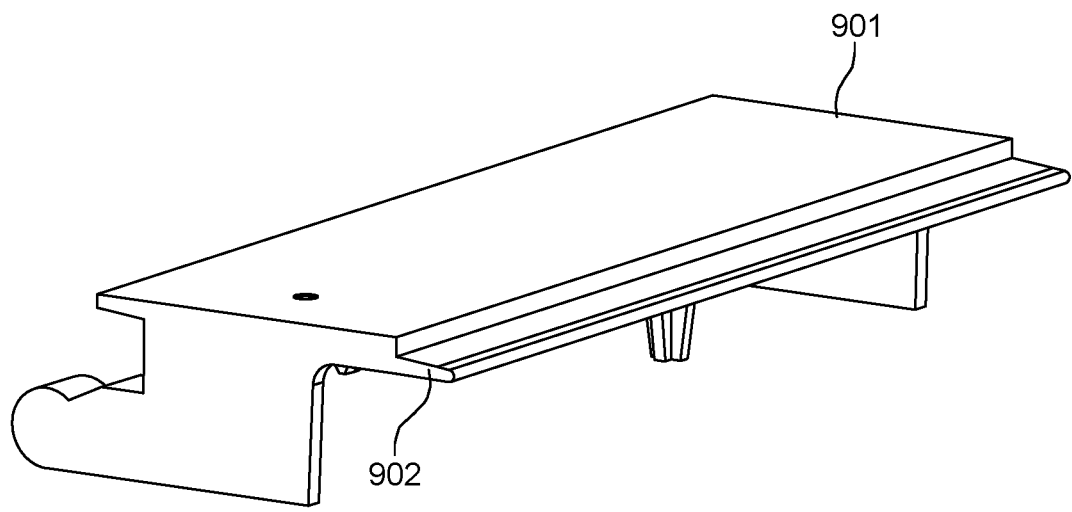
FIG. 10A, FIG. 10B, and FIG. 10C are diagrams illustrating various views of a device button including a light blocking horn, according to embodiments.
Figure 10B:
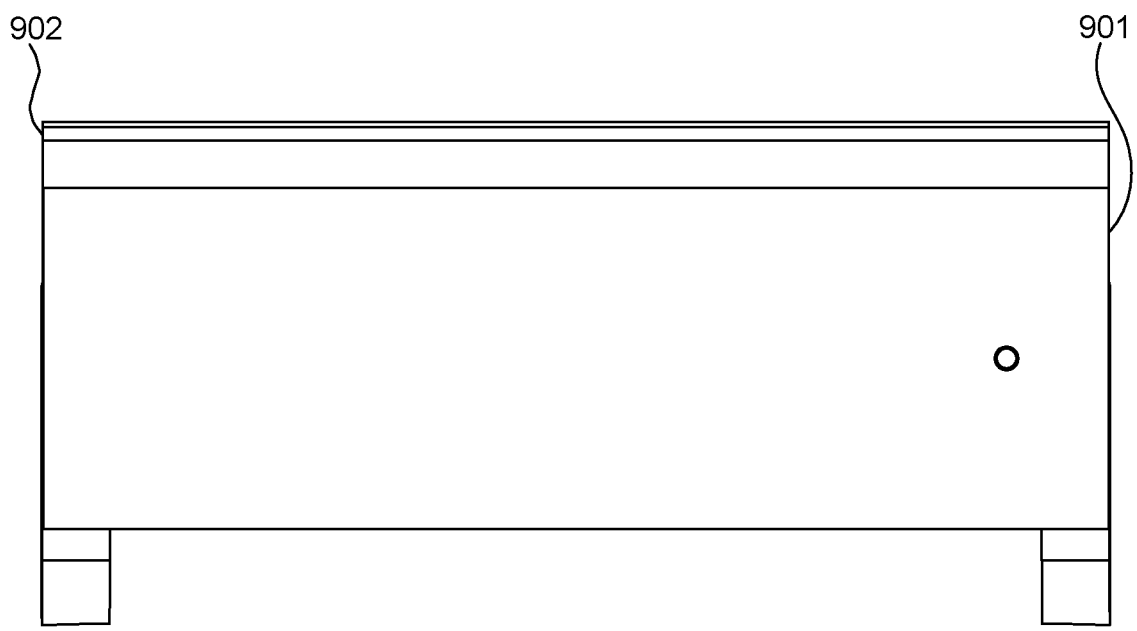
Figure 10C:
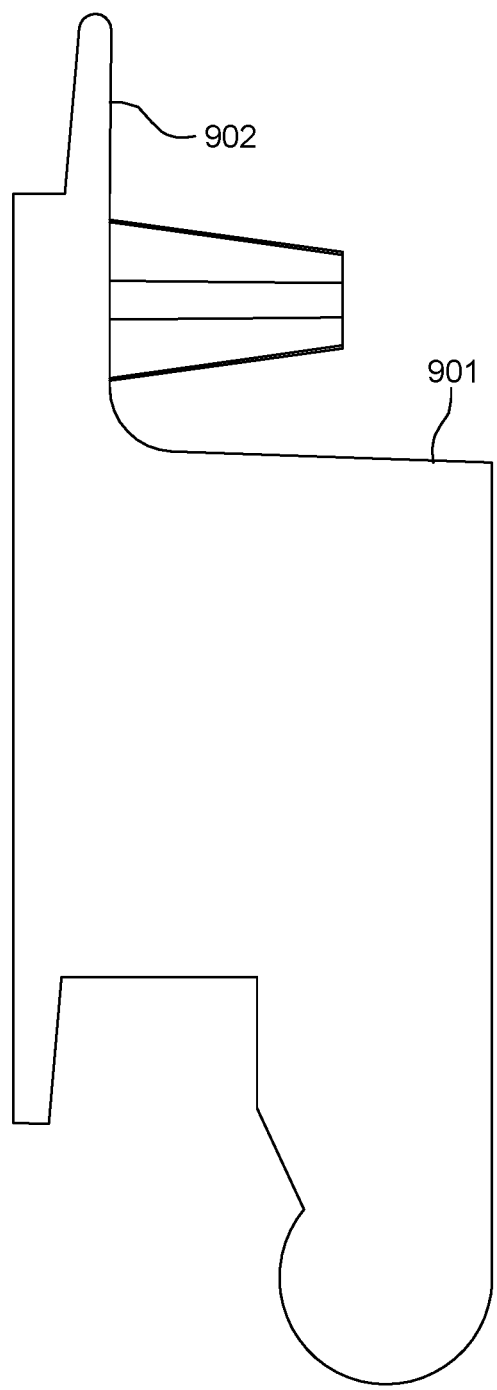

FIG. 9A and FIG. 9B are diagrams illustrating a device button including a light blocking horn, according to embodiments. FIG. 10A, FIG. 10B, and FIG. 10C are diagrams illustrating various views of a device button including a light blocking horn, according to embodiments.

According to embodiments, a junction box assembly may include a button 901 having (e.g., including) a light blocking horn 902, for example, that is disposed at (e.g., designed into, part of, connected to, etc.) a front of the button 901, for example, for blocking light. According to embodiments, such a horn 902 may be included in (e.g., designed into) a front (e.g., end, side, part, etc.) of each button 901. According to embodiments, in a case of a light blocking horn 902 of a button 901, light (e.g., emitted, diffused, emanating, etc., from) between buttons 901 may be blocked. In such a case, for example, use of foam and/or other additional pieces may be avoided and/or minimized/reduced.

Figure 11A:
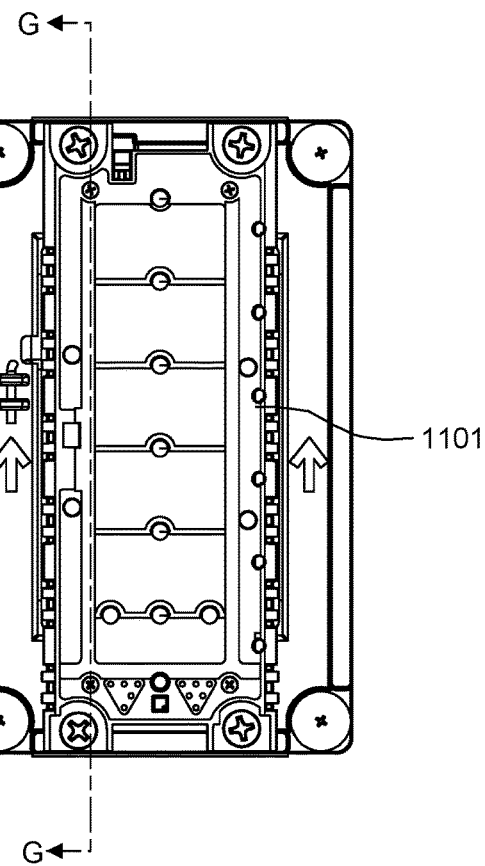
FIG. 11A and FIG. 11B are diagrams illustrating an Electro-Static Discharge (ESD) shield, according to embodiments.
Figure 11B:
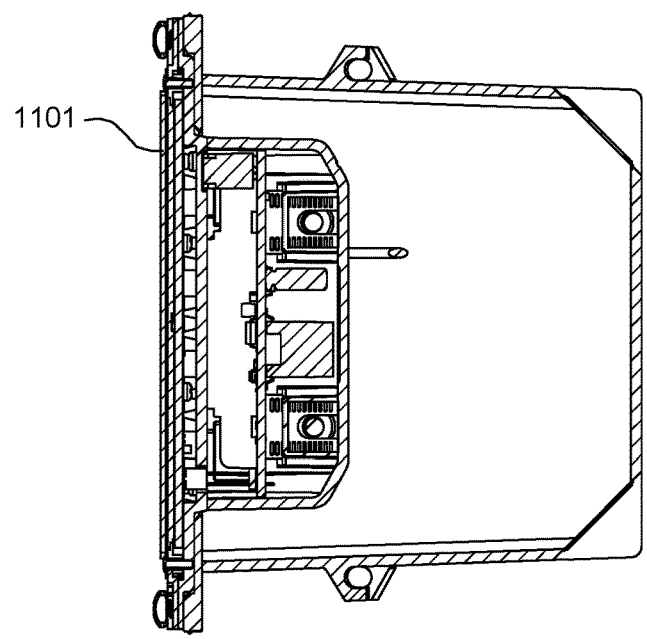

FIG. 11A and FIG. 11B are diagrams illustrating an Electro-Static Discharge (ESD) shield, according to embodiments.

According to embodiments, a junction box assembly may include (e.g., may have) an electro-static discharge (ESD) shield 1101. In a case of an ESD shield 1101 according to embodiments, for example, as shown in FIG. 11A and FIG. 11B, (e.g., each of the) devices (e.g., having a metal yolk) included in a junction box may contact (e.g., connect to) an earth ground, for example, via the ESD shield 1101 disposed on a top surface, or in other words, an upper surface ESD shield 1101. According to embodiments, a spring feature is created by bending a portion of the ESD shield 1101 around the device. According to embodiments, such curved feature of the ESD shield 1101 may be shaped to act like a spring contact against a subplate (e.g., a base plate), for example, so that the spring feature is retained in the button base and yolk plate parts in the device assembly. According to embodiments, in such a case, ESD damage to the unit may be avoided, for example, using a (e.g., thin) metal ESD shield 1101 on the outside of the junction box. According to embodiments, an ESD shield 1101 may contact (e.g., connect to) earth ground via screws that tie (e.g., connect) the ESD shield 1101 to a device yoke plate that contacts (e.g., further and/or then makes contact with) a metal base plate. According to embodiments, there may be various methods of tying and/or attached the ESD shield 1101 to a metal base plate.

Figure 12A:
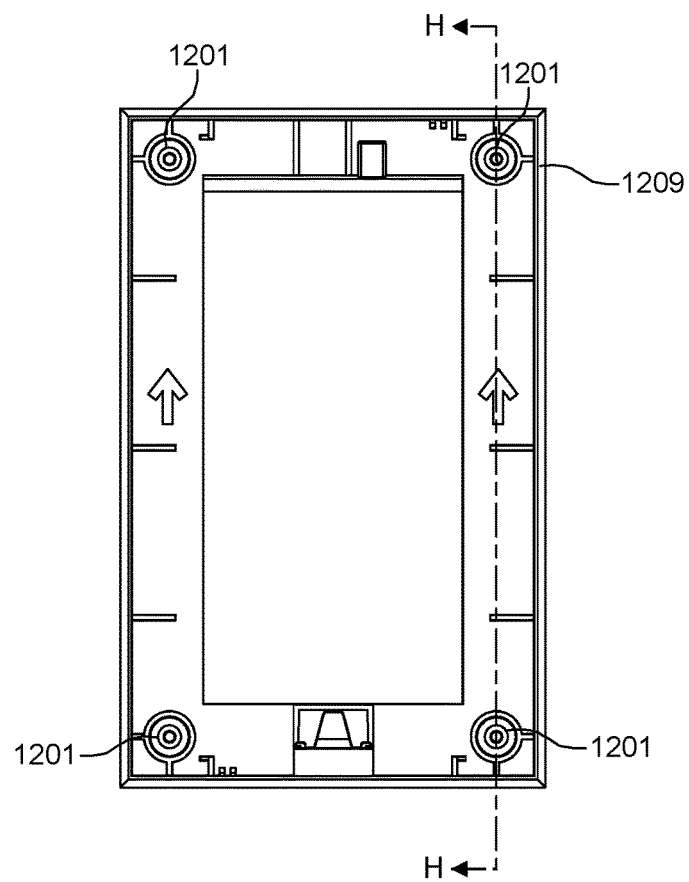
FIG. 12A and FIG. 12B are diagrams illustrating a mounting magnet for a face plate, according to embodiments.
Figure 12B:
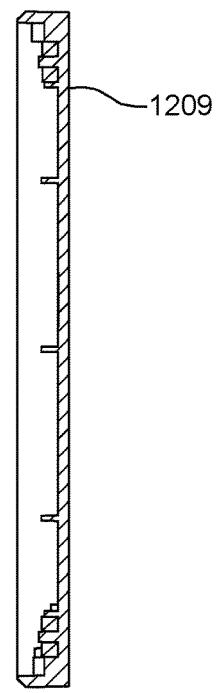

FIG. 12A and FIG. 12B are diagrams illustrating a mounting magnet for a face plate, according to embodiments.

According to embodiments, a junction box assembly may include a face plate 1209 having (e.g., including) mounting magnets 1201 having (e.g., including) any of a magnet pattern and a fastening method. According to embodiments, a mounting magnet 1201 may be (e.g., used) for fastening the face plate 1209 to a base plate. According to embodiments, a mounting magnet 1201 may avoid center bowing and/or misalignment, for example, because of a (e.g., unique) pattern, for example, that avoids and/or prevents center bowing or misalignment. For example, according to embodiments, four magnets may be placed at corners of the face plate for attachment. In some cases, for example, in cases of large gang face plates, additional magnets may be used, for example at centered locations and/or at other locations to help attachment. According to embodiments, a mounting magnet 1201 may be heat staked in place, for example, so as to avoid gluing and/or other assembly methods. According to embodiments, a countersunk (e.g., circular) magnet may be attached by heat steaking a plastic post through the center of the magnet, and for example, reduces tolerance issues associated with a snap based design. According to embodiments, such may be referred to as a (e.g., unique) circular snapping method.

According to embodiments, a junction box assembly may include a mounted indicator LED and/or features for mounting an indicator LED. According to embodiments, an indicator LED mounting may have a snap mounting method. In this regard, according to embodiments, an indicator light pipe (e.g., that attaches and/or mounts to an indicator LED) may have a (e.g., unique) circular snapping method, for example, that allows for minimal material and/or machine placement. According to embodiments, an indicator LED mounting may be symmetrical, that is, may have a symmetrical shape.

According to embodiments, a junction box assembly may include (although not shown) any of a separate indicator LED, for example, providing and/or allowing for custom backlighting (e.g., configurable according to user preferences). According to embodiments, a separate indicator LED may provide status indication of the button. According to embodiments, a separate indicator LED may provide (e.g., allow for) separating product status indication lighting from engraved backlighting, for example, to allow a user of junction box assembly to perceive status indication information and/or lighting separately from button backlighting. According to embodiments, in a case of a separate LED indicator, lighting products may allow for (e.g., completely) custom backlit engraving text.

Figure 13A:
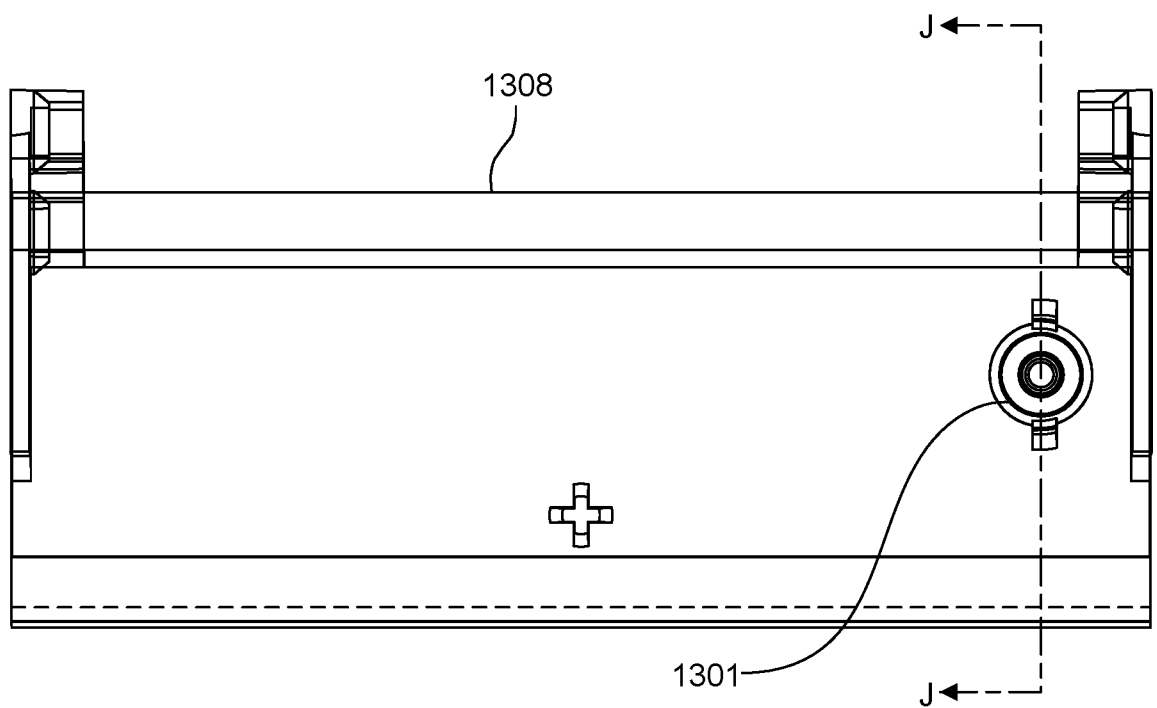
FIG. 13A and FIG. 13B are diagrams illustrating an indicator light pipe, according to embodiments.
Figure 13B:
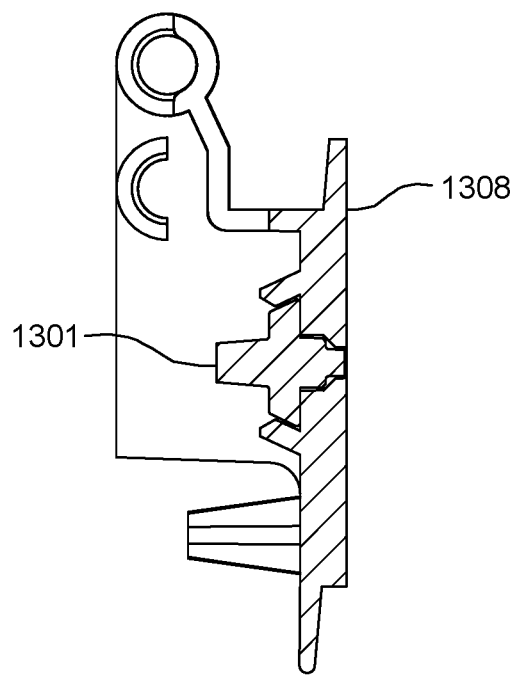

FIG. 13A and FIG. 13B are diagrams illustrating an indicator light pipe, according to embodiments.

According to embodiments, a light pipe 1301 may be for guiding light emitted by an LED, and may be referred to as an LED light pipe 1301, and in a case of guiding light used for indicating (e.g., a status of a button 1309, a switch, etc.), the light pipe 1301 may be referred to as an indicator LED light pipe 1301. According to embodiments, a light pipe 1301 may be included in (e.g., as any of a separate element, and attached element, or a molded element) a button 1308. According to embodiments, an indicator LED light pipe 1301 may be for providing light for more than one indication, for example, by guiding (e.g., channeling) light emitted by any number of LEDs to any number of elements, such as buttons, switches, border, areas, etc. According to embodiments, an indicator LED light pipe 1301 may be for buttons 1308 of varying sizes (e.g., heights, widths, depths), such as, for example, a dual height (e.g., 2H) button. In a case of a 2H button having at least 2 LEDs, according to embodiments, a light pipe 1301 may include multiple sections, one or more of which may be for connecting to the at least 2 LEDs.

According to embodiments, (e.g., any one or more of) the multiple sections of the light pipe 1301 may be for funneling light from (e.g., respective, each, several, etc.) LEDs, for example, into one or more other sections of the light pipe 1301, for example, to create (e.g., simulate) a single light source. According to embodiments, one or more of the LEDs may have same/similar or different characteristics. According to embodiments, one or more of the multiple sections may have (e.g., need, require) features and/or characteristics that are different from others of the multiple sections, for example, to provide consistent light characteristics at the output. According to embodiments, one or more of the multiple sections may have (e.g., particular, distinct, certain, etc.) features for light pipe angles and LED intensity, for example, to allow light matching in a single LED light pipe 1301. Accordingly, there may be a reduced number of LEDs, for example, on a PCB of a junction box, thus reducing complexity and cost.

According to embodiments, a junction box assembly may include an ambient light pipe 310, 410 for sensing and/or detecting ambient light, for example, as detected in (e.g., as emitted by) a room, or any other such area/environment. Such ambient light pipe 310, 410 may be referred to as an ambient light sensor pipe. According to embodiments, there may be an assembly method for an ambient light sensor light pipe, such that, for example, the ambient light sensor light pipe has (e.g., a unique) snap design features to fasten to the face plate. According to embodiments, such features may include any of a length of snap (e.g., snapping, snappable, etc.) elements, a flexibility and/or durability (e.g., material, dimensions, etc.) of snap elements, and a position and/or location of snap elements (e.g., outside of area of light transmission though light pipe, for example to reduce unwanted light loss). In such a case, the face plate may ship with the ambient light sensor already in place using the unique snaps.

Figure 14B:
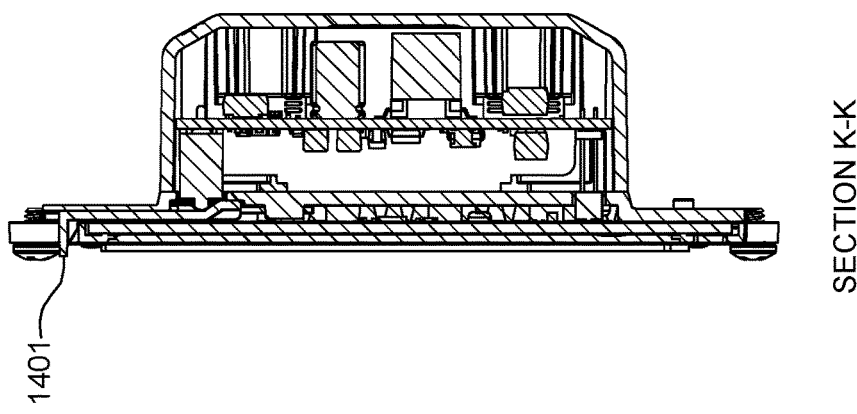
FIG. 14A and FIG. 14B are diagrams illustrating an air gap switch, according to embodiments.
Figure 14A:
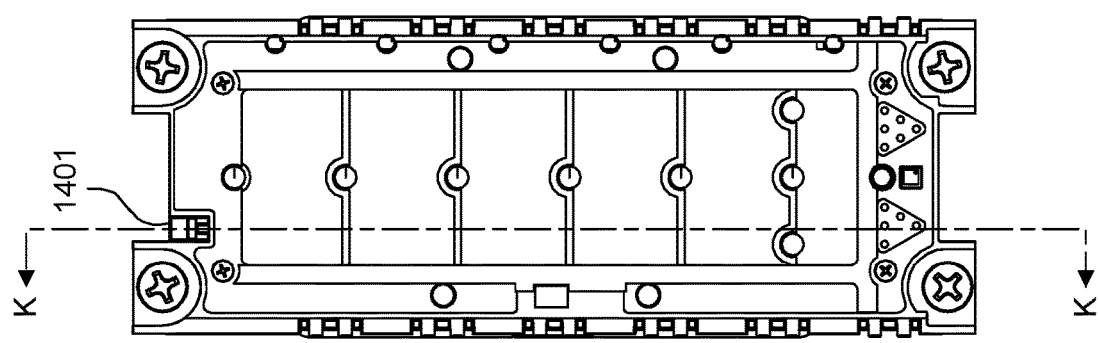
Figure 15:
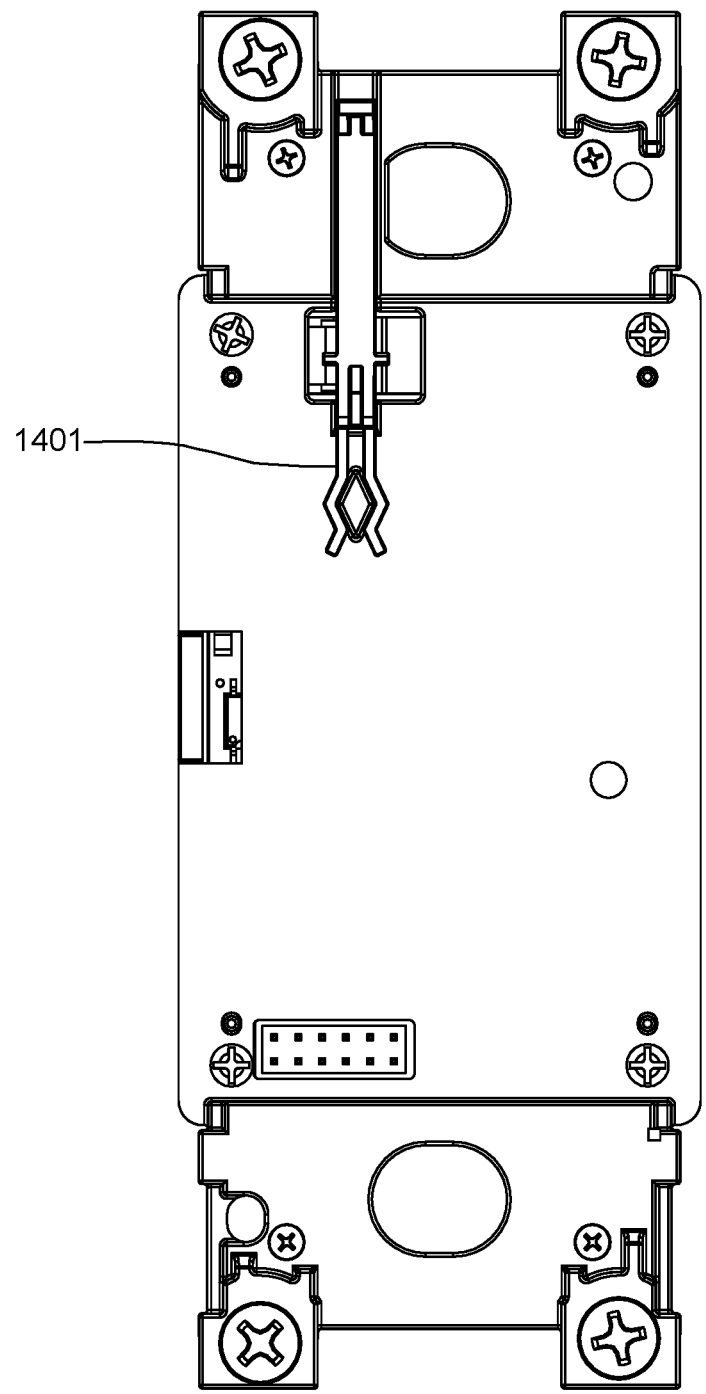
FIG. 15 is a diagram further illustrating an air gap switch, according to embodiments.

FIG. 14A, FIG. 14B, and FIG. 15 are diagrams illustrating an air gap switch, according to embodiments.

According to embodiments, a junction box assembly may include an air gap switch 1401 (e.g. slider 1401), for example, that provides any of increased durability and/or usable lifetime. According to embodiments, an air gap switch 1401 may include a (e.g., has designed in) pincers, for example, that may snap onto a cast zinc yoke plate. According to embodiments, the pincers of such an air gap switch slider may provide (e.g., allow for) a lifetime of snaps with positive indication of on/off.

FIG. 16A and FIG. 16B are diagrams illustrating a sub-plate steel screw, according to embodiments.

According to embodiments, a junction box assembly may include a base plate (e.g., a sub-plate) steel screw 1601 providing magnetic contact to a base plate. According to embodiments, a magnetic steel plate may be formed of a screw 1601 that is threaded on one side, for example, to attach (e.g., screw into) to a base plate. According to embodiments, in a case of a steel screw 1601 being magnetic and having a threaded side for attaching to a base plate, the steel screw 1601 may be attached to the base plate without use of glue or other similar bonding type of fastening methods.

Figure 17E:
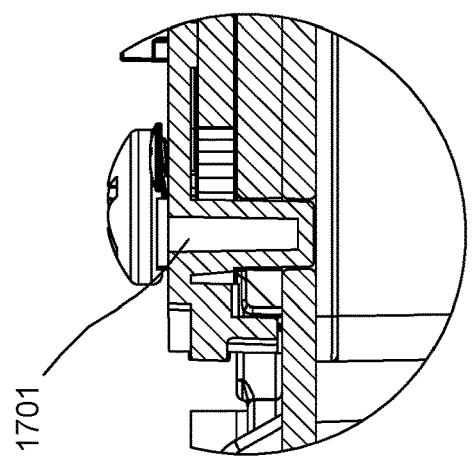
FIG. 17E is a diagram illustrating a detail of FIG. 17D.
Figure 17D:
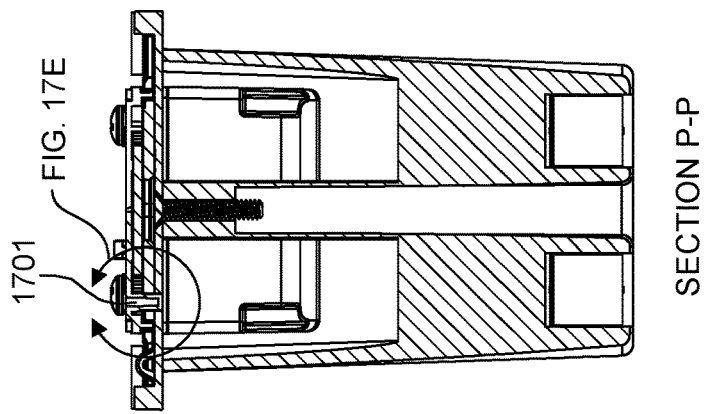
FIG. 17D is a diagram illustrating Section P-P of FIG. 17A.
Figure 17C:
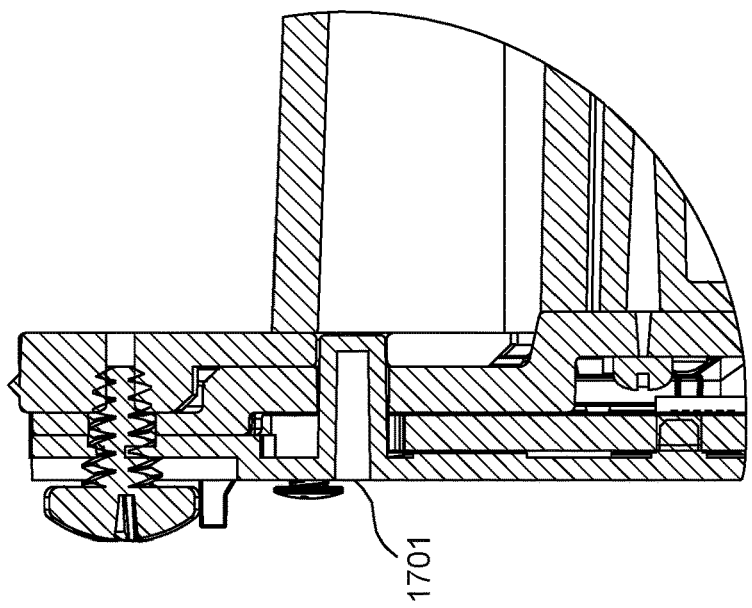
FIG. 17C, is a diagram illustrating a detail of FIG. 17B.

FIG. 17A is a diagram illustrating an alignment element, according to embodiments. FIG. 17B is a diagram illustrating Section M-M of FIG. 17A. FIG. 17C, is a diagram illustrating a detail of FIG. 17B. FIG. 17D is a diagram illustrating Section P-P of FIG. 17A. FIG. 17E is a diagram illustrating a detail of FIG. 17D.

According to embodiments, a junction box assembly may include an alignment element 1701, for example, that is a single pin assembly having a single pin 1701 connecting to any (e.g., all) elements, layers, components, devices, etc., (e.g., that may be any of large, significant, major, etc.) in the junction box assembly. According to embodiments, a single pin 1701 may (e.g., be used to) align all (e.g., major) components (e.g., that may be aligned) in the junction box assembly, for example, by any of attaching, connecting, integrating, sliding in, etc., to the components. According to embodiments, a single pin 1701 (e.g., which may also be referred to as an alignment pin, an alignment element/part, etc.) may limit (e.g., possible) tolerance issues and provide (e.g., more, nearly, increased, etc.) alignment of any of the connected devices, elements, and/or parts included in the junction box assembly. According to embodiments, the alignment element 1301 that is a single point of contact for (e.g., major) elements being aligned is not limited to a single pin and/or a pin shape. That is, according to embodiments, the alignment element 1301 may be any suitable and/or similar singular shape that is (e.g. provides) a single point of contact for (e.g., major) elements being aligned.

Figure 18:
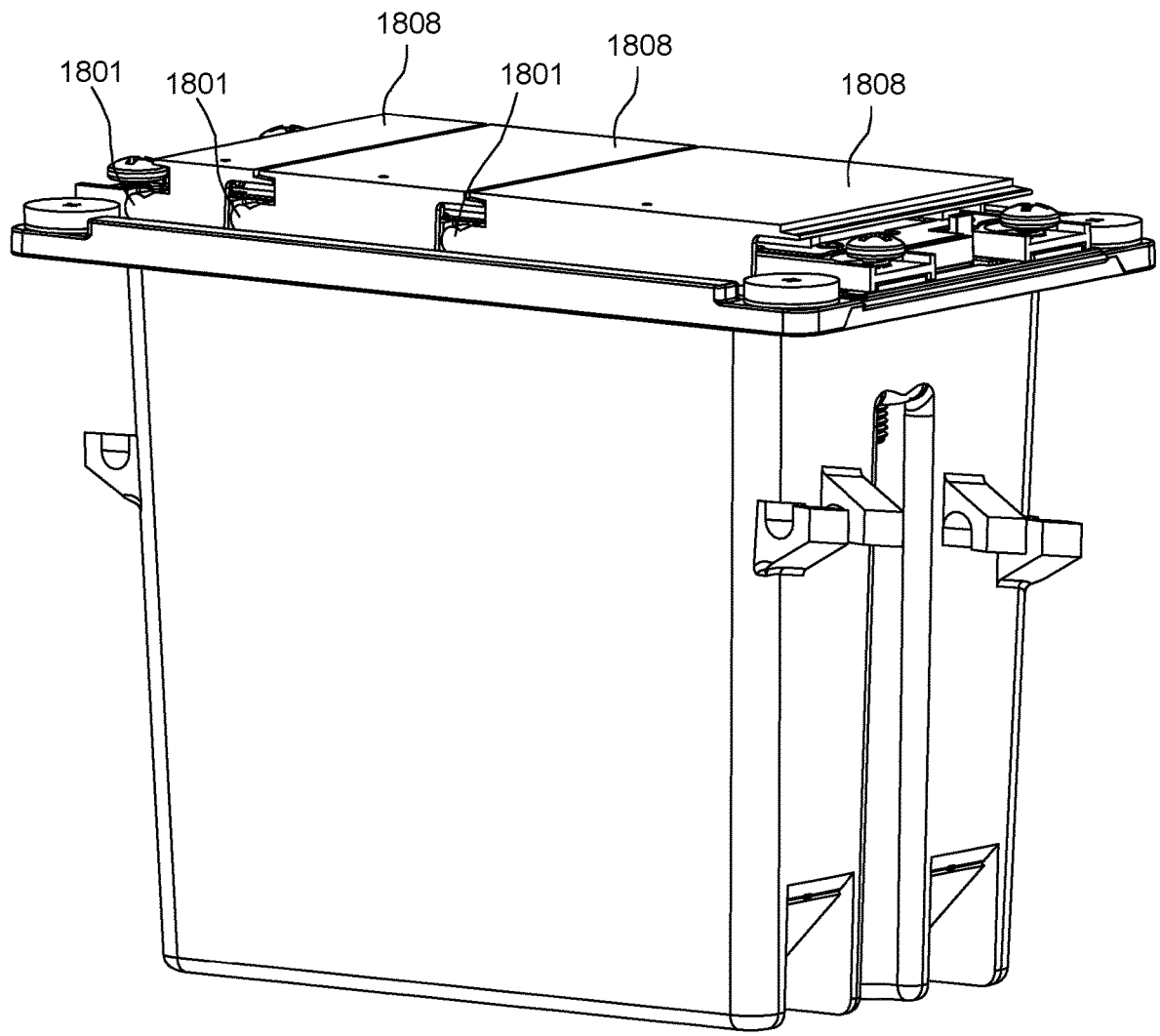
FIG. 18 is a diagram illustrating a button having a rear pivot, according to embodiments.
Figure 19B:
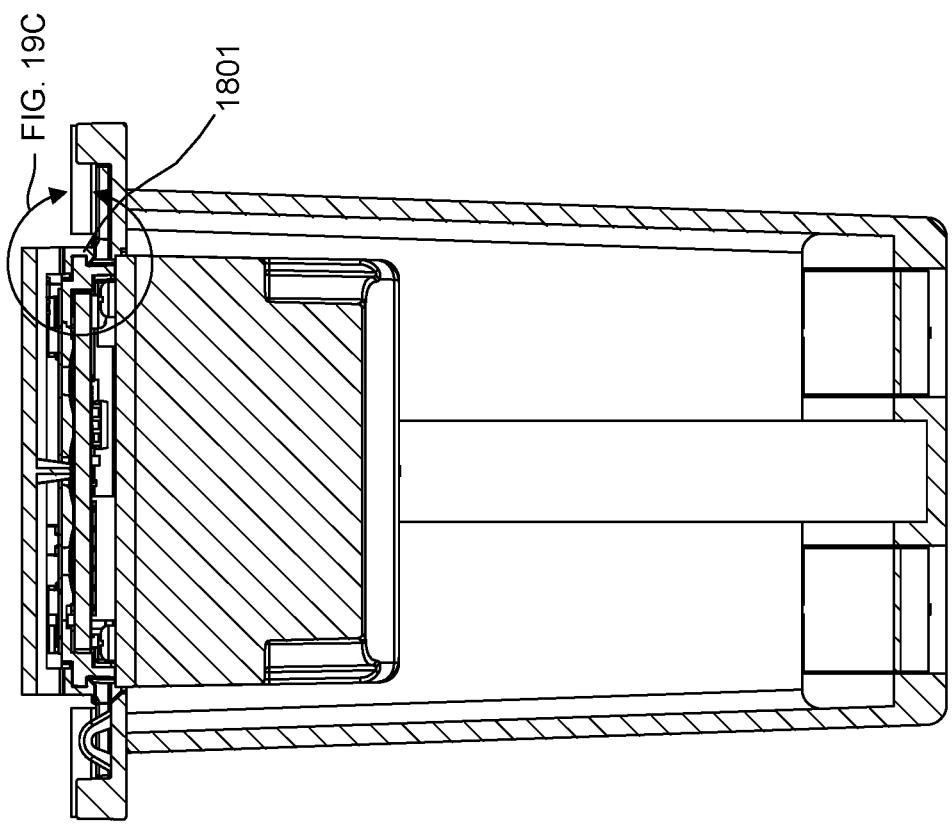
FIG. 19B is a diagram illustrating Section T-T of FIG. 19A.
Figure 19A:
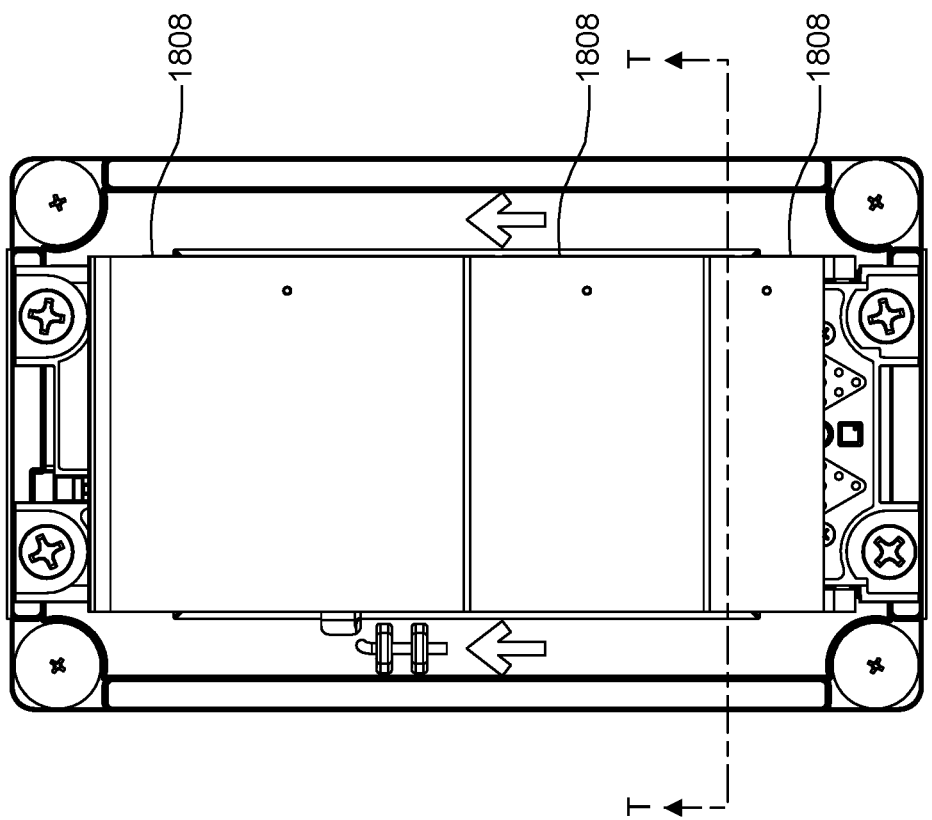
FIG. 19A is diagram further illustrating a button having a rear pivot, according to embodiments.
Figure 19C:
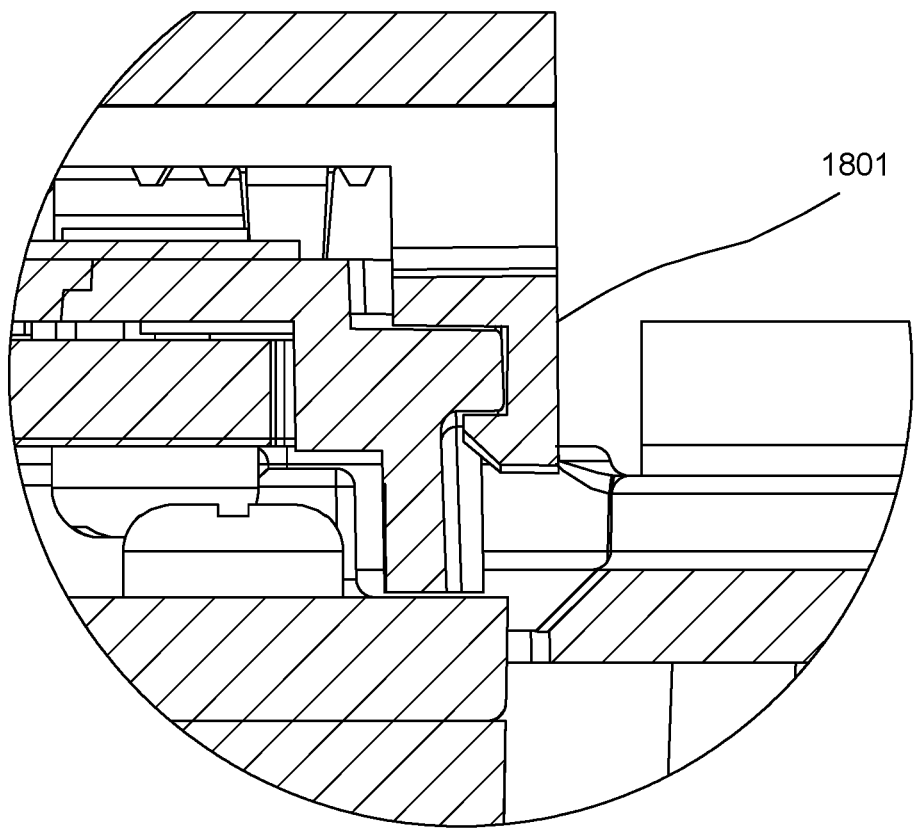
FIG. 19C is a diagram illustrating a detail of FIG. 19B.

FIG. 18 and FIG. 19A are diagrams illustrating a button having a rear pivot, according to embodiments. FIG. 19B is a diagram illustrating Section T-T of FIG. 19A. FIG. 19C is a diagram illustrating a detail of FIG. 19B.

According to embodiments, a junction box assembly may include a button 1808 having a rear pivot 1801 (e.g., a rear button pivot 1801). According to embodiments, a button 1808 having a rear pivot 1801, which may be a flat (e.g., non-rocker) button 1808, may have (e.g., include) the rear pivot 1801 for creating positive activation when pressed (e.g., by a person) anywhere on the button. According to embodiments, the button 1808, which may be referred to as a non-rocker sized button, may use a unique rear pivot 1801, for example, that allows for positive activation when the button is pressed anywhere, such as, for example, including the back edge of the button. In other words, according to embodiments, in a case of a rear pivot button for 1, 2, and 3 high buttons, a rotation axis of the button pivot may be below the "working area" of the button face. In such a case, there may be no "dead spot" on the button and the button will work when pressed anywhere on the "working area" face. According to embodiments, a button 1808 having a rear pivot 1801, which may not be a rocker (e.g., a not flat) button, may have (e.g., include) multiple rear pivots 1801, for example, creating positive activation when pressed (e.g., by a person) anywhere on the button.

Figure 20B:
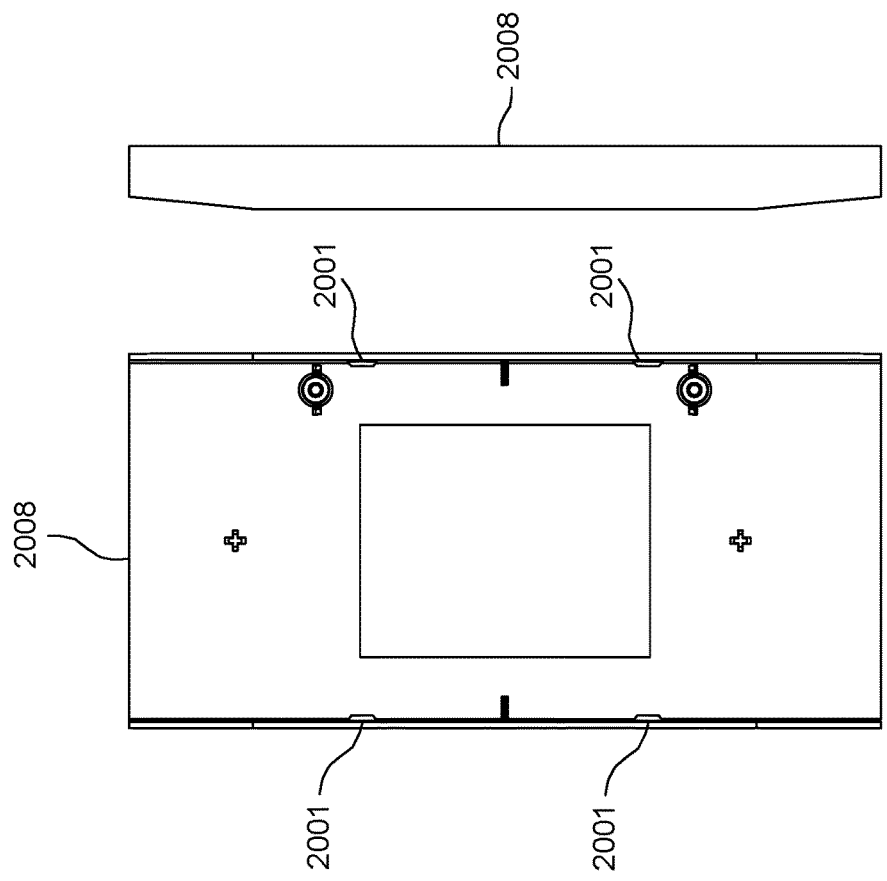
FIG. 20A, FIG. 20B, and FIG. 21A are diagrams illustrating various views of a rocker button, according to embodiments.
Figure 20A:
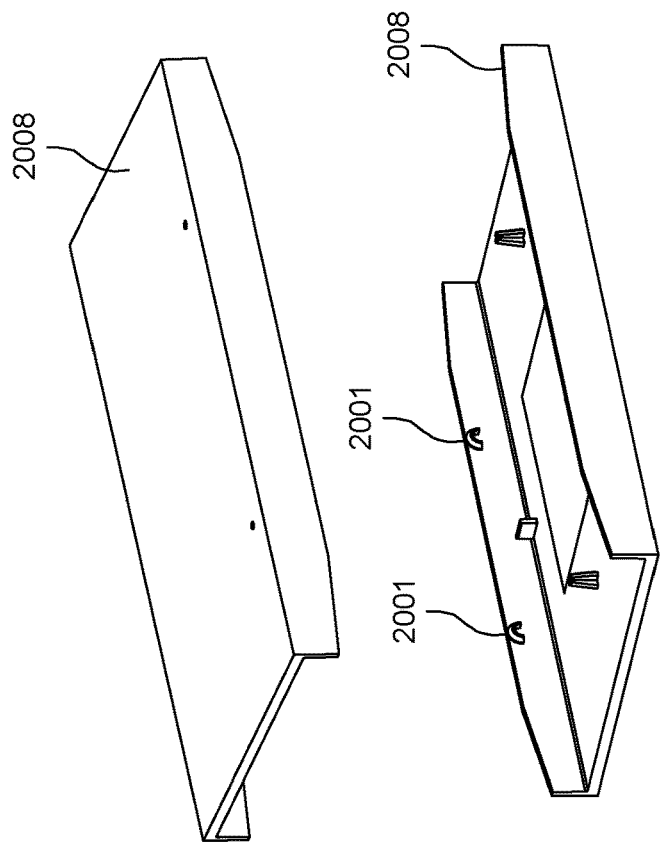
Figure 21B:
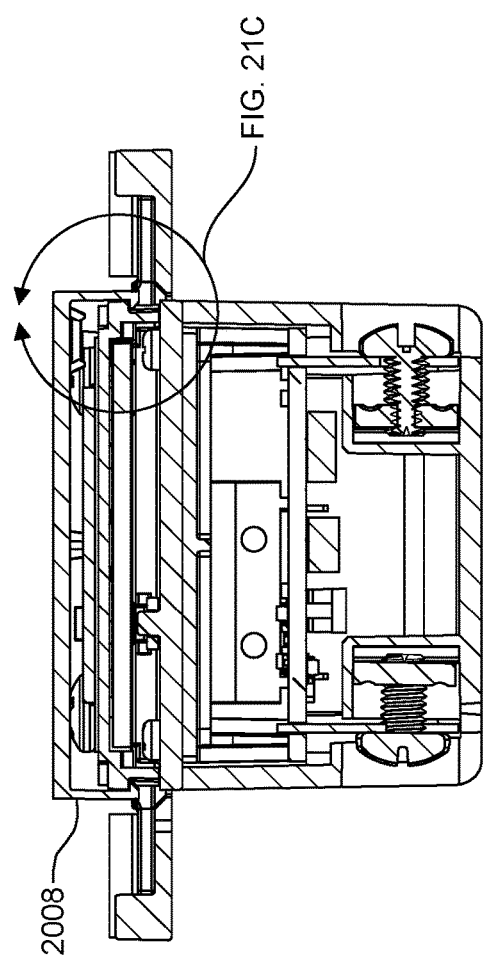
FIG. 21B is a diagram illustrating Section W-W of FIG. 21A.
Figure 21C:
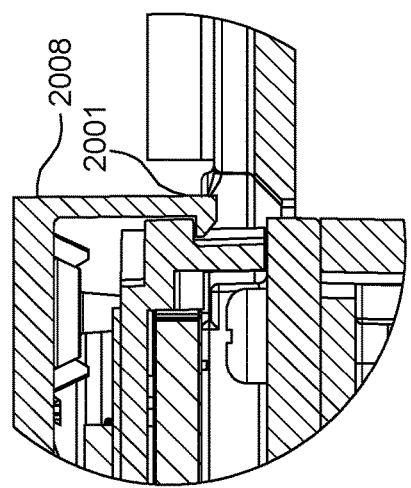
FIG. 21C is a diagram illustrating a detail of FIG. 21B.
Figure 21A:
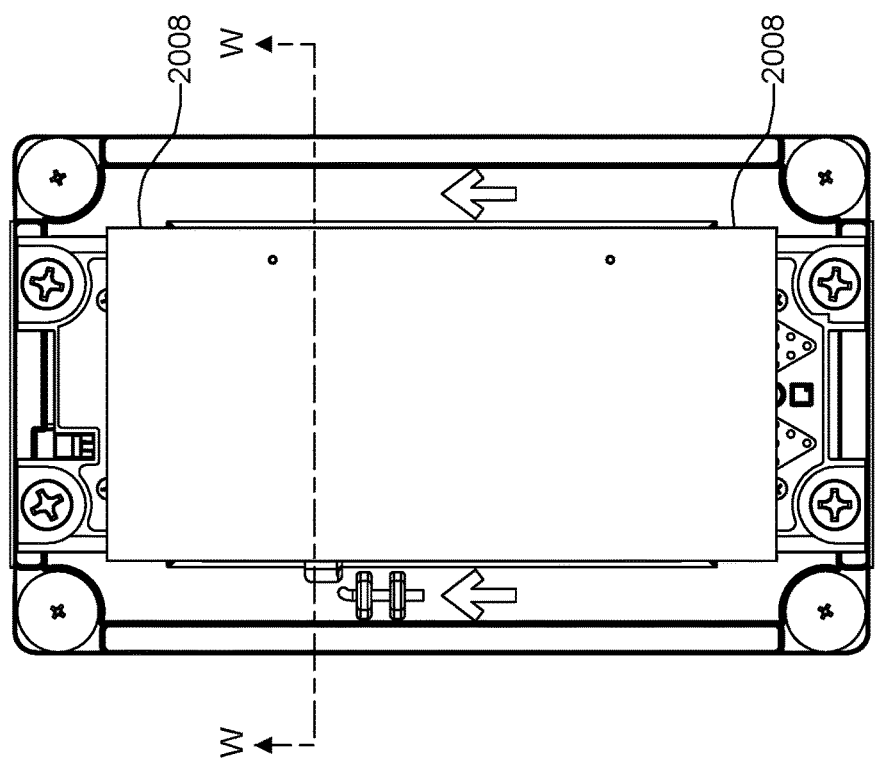

FIG. 20A, FIG. 20B, and FIG. 21A are diagrams illustrating various views of a rocker button, according to embodiments. FIG. 21B is a diagram illustrating Section W-W of FIG. 21A. FIG. 21C is a diagram illustrating a detail of FIG. 21B.

According to embodiments, a rocker button 2008 may have a pivot and/or lever 2001 in each (e.g., every, all, etc.) corners of the button 2008, for example, so that when the button 2008 is pressed in any location, a certain (e.g., respective, correct, etc.) corner pivot 2001 and/or corner lever 2001 is used (e.g., engaged, enabled, levered, etc.), for example, to achieve consistent and positive activation. That is, according to embodiments, in the (e.g., far, extreme, etc.) corners of the button 2008, one snap 2001 may act as the major pivot point, and in such a case, a flexibility of a surface of the button 2008 may also aid in button activation at the corners. According to embodiments, in a case of rocker buttons 2008, a (e.g., floating) pivot 2001 design may be used such that a rotation axis of the button 2008 changes depending on where the button 2008 is pressed. According to embodiments, this is because a button 2008 may be constrained, for example, using the half of the mounting pins and the dome actuator on the PCB board.

Figure 22C:
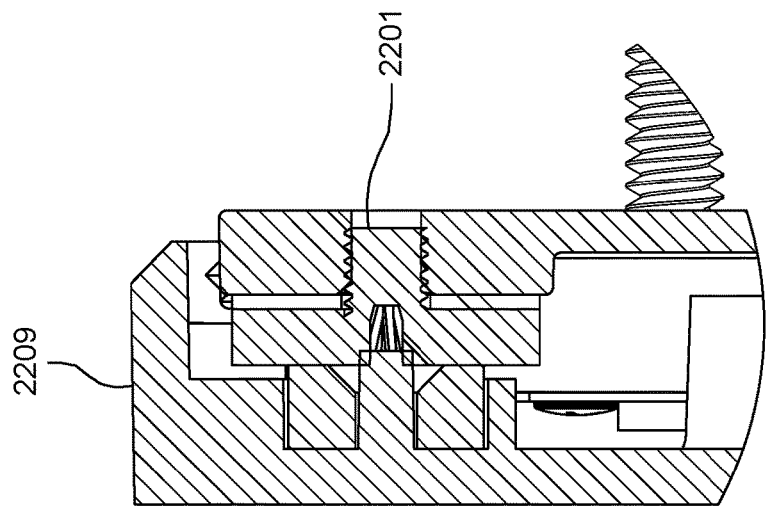
FIG. 22C is a diagram illustrating a detail of FIG. 22B.
Figure 22B:
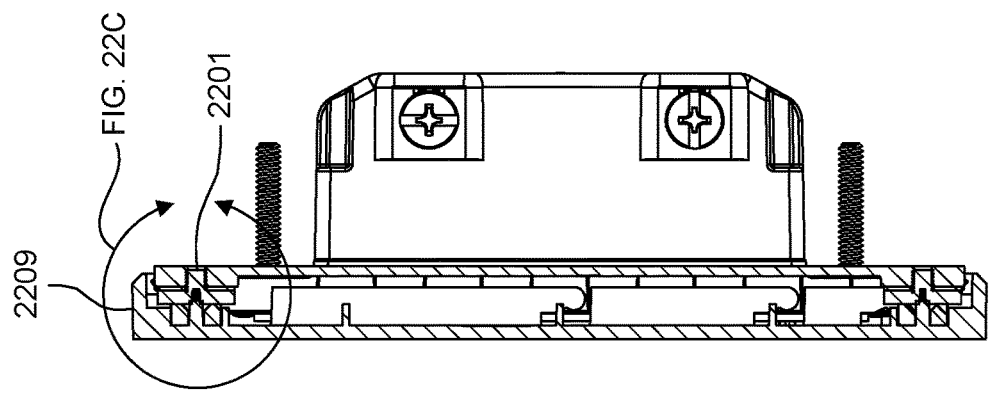
FIG. 22B is a diagram illustrating Section AC-AC of FIG. 22A.
Figure 22A:
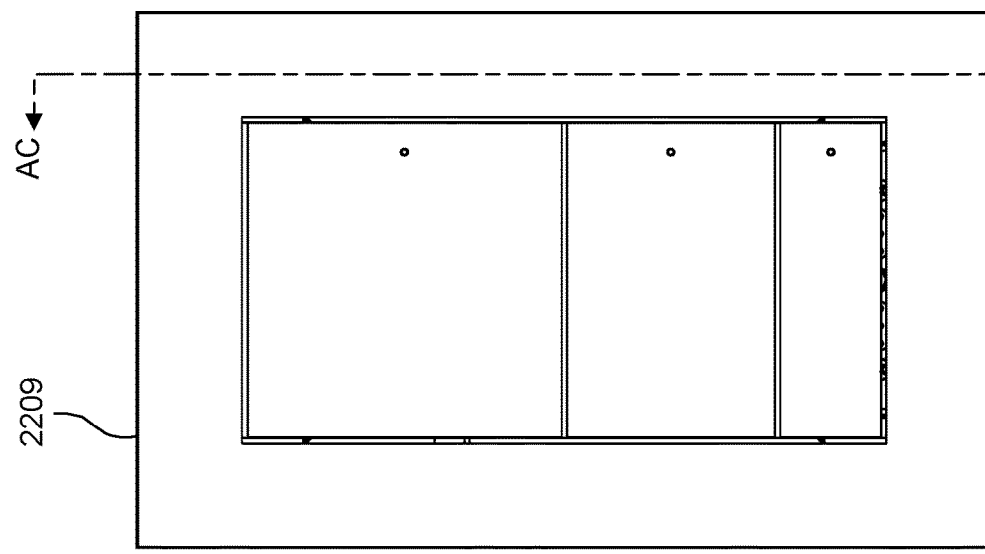
FIG. 22A is a diagram illustrating a face plate, according to embodiments.

FIG. 22A is a diagram illustrating a face plate, according to embodiments. FIG. 22B is a diagram illustrating Section AC-AC of FIG. 22A. FIG. 22C is a diagram illustrating a detail of FIG. 22B.

According to embodiments, a junction box assembly may include a face plate 2209, for example, having (e.g., including) an adjustable face plate height. According to embodiments, a face plate 2209 having adjustable height, for example, provided by (e.g., included) steel screws 2201 for (e.g., used in the, attaching to, etc.) a base plate for (e.g., providing) magnetic attachment of the face plate 2209. According to embodiments, such base plate screws 2201 may be turned in or out, for example, to change the height of each magnetic attachment point, and in such a case, controlling the height of a front surface of the face plate 2209. According to embodiments, a washer may be (e.g., used) under the base plate screws 2201, for example, to set a default and/or normal height of the face plate 2209, for example, with no adjustment.

According to embodiments, a face plate 2009 may be magnetic. That is, according to embodiments, a (e.g., nearly) full and/or complete surface of a face plate 2209 may be a magnet and/or magnetized, for example, with no (e.g., additional) attachment and/or snap points for attaching to the junction box assembly and/or wall. According to embodiments, in a case of a magnetized face plate 2209 for a large junction box (e.g., 3-gang, 4-gang, etc.), locations of magnetism of the face plate may attach the magnetized face plate to the junction box assembly and/or wall, for example, such that additional (e.g., no further, zero, etc.) attachment points (e.g., snaps, prongs, clasps, etc.) are needed (e.g., required).

Figure 23B:
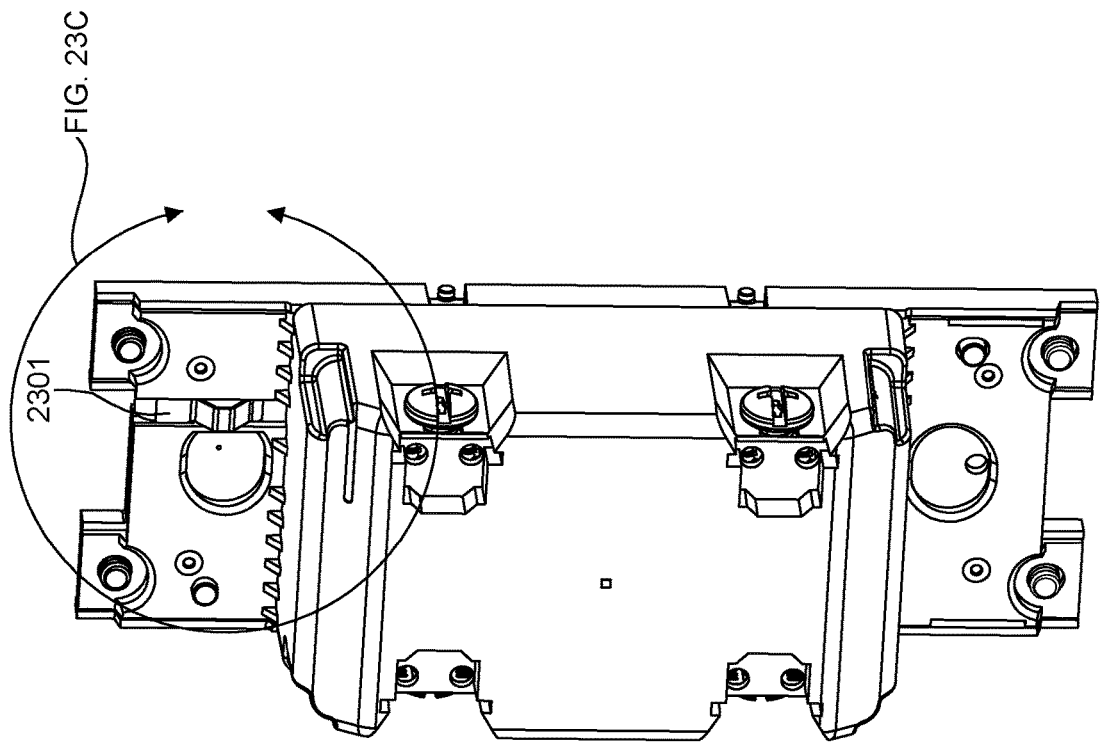
FIGS. 23A and 23B are diagrams illustrating views of ESD shielding, according to embodiments.
Figure 23A:
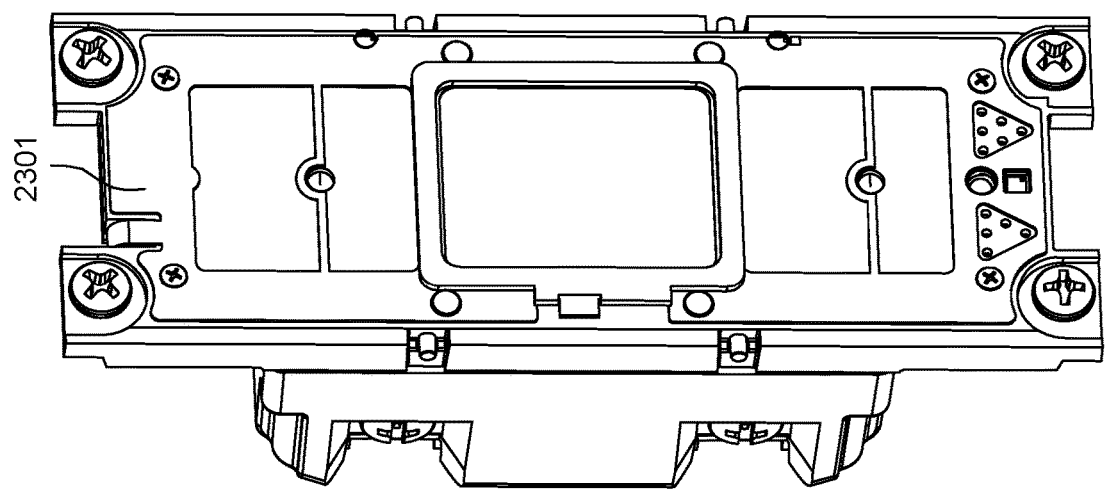
Figure 24A:
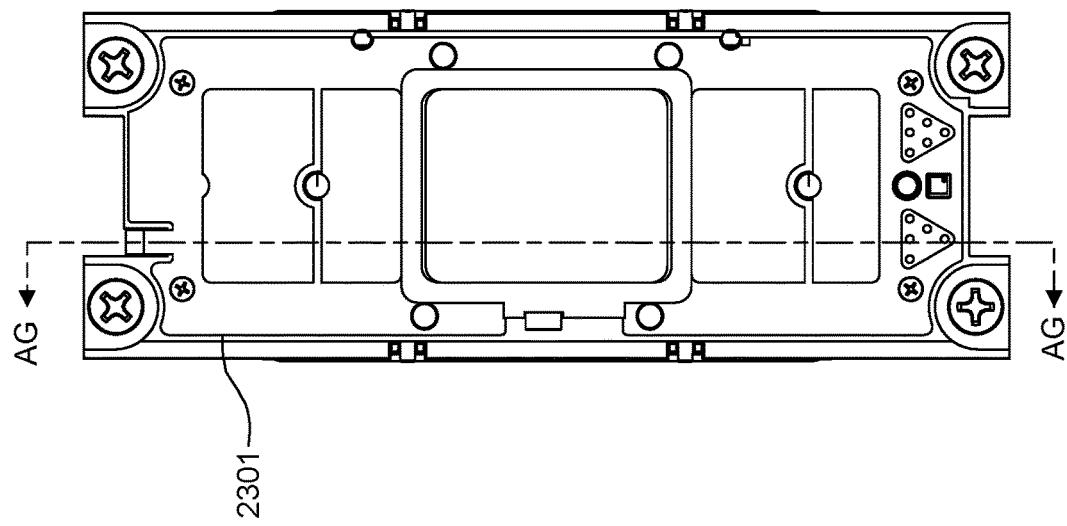
FIG. 24A is diagram illustrating another view of ESD shielding, according to embodiments.
Figure 23C:
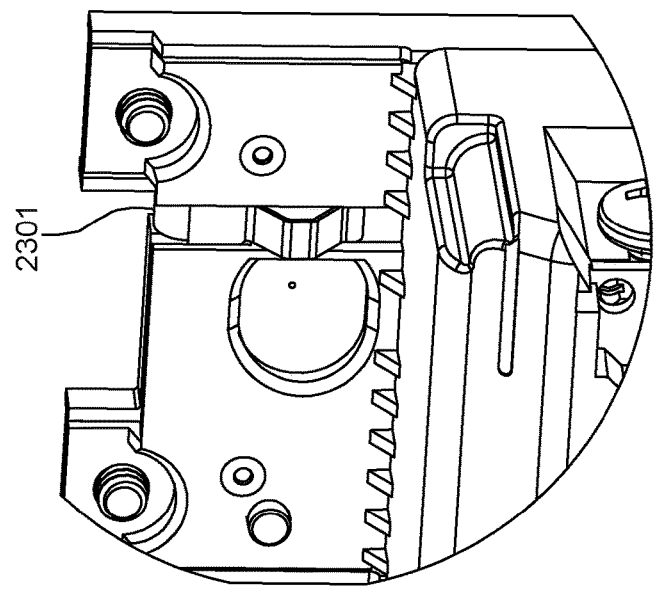
FIG. 23C is a diagram illustrating a detail of FIG. 23B.
Figure 24C:
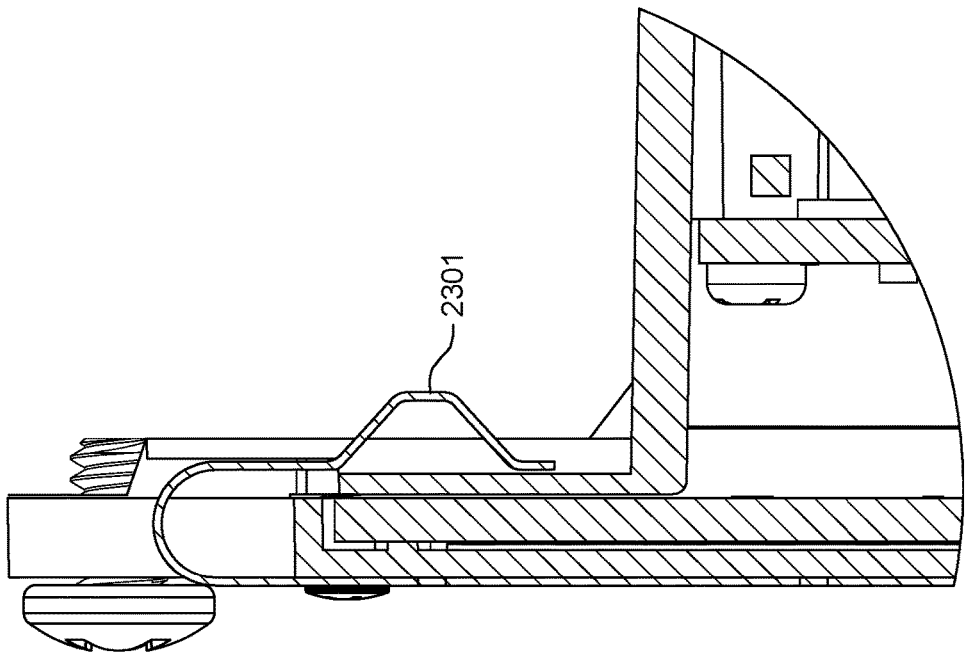
FIG. 24C is a diagram illustrating a detail of FIG. 24B.
Figure 24B:
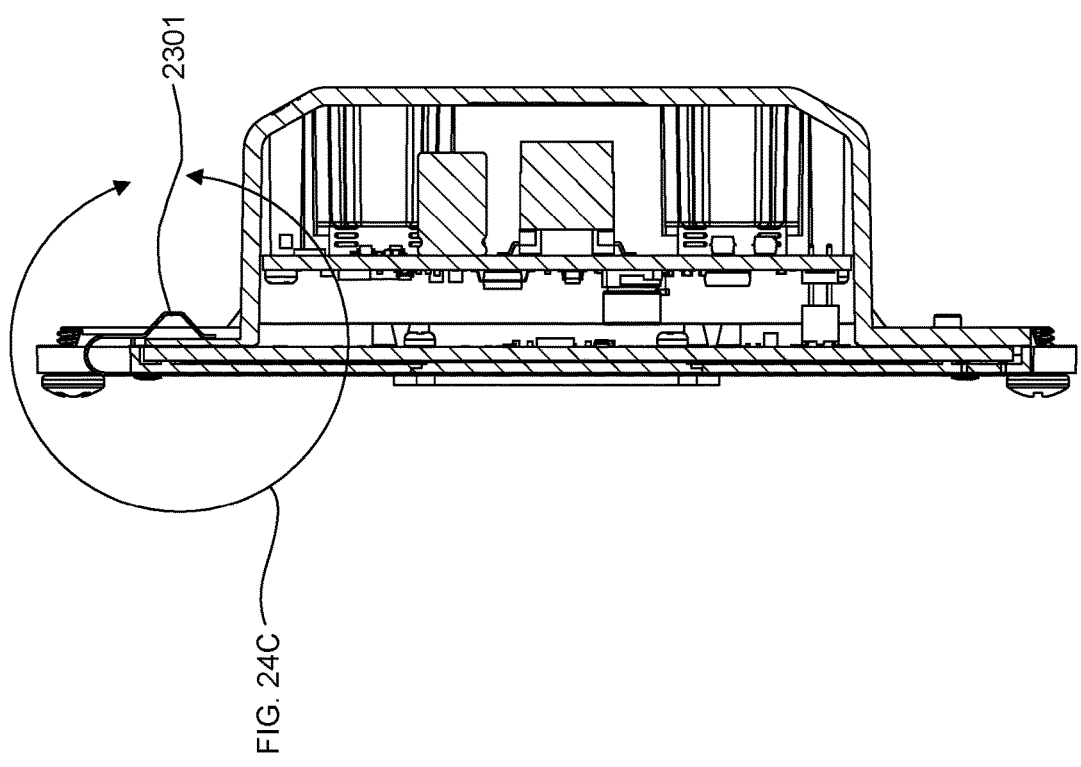
FIG. 24B is a diagram illustrating Section AG-AG of FIG. 24A.

FIGS. 23A and 23B are diagrams illustrating views of electro-static discharge (ESD) shielding, according to embodiments. FIG. 23C is a diagram illustrating a detail of FIG. 23B. FIG. 24A is diagram illustrating another view of electro-static discharge (ESD) shielding, according to embodiments. FIG. 24B is a diagram illustrating Section AG-AG of FIG. 24A. FIG. 24C is a diagram illustrating a detail of FIG. 24B.

According to embodiments, a junction box assembly may include ESD shielding 2301. According to embodiments, a ESD shield 2301 having (e.g., including, designed for, etc.) grounding to a base plate having (e.g., using, by, via, etc.,) an integrated spring. According to embodiments, an ESD shield 2301 may be (e.g., may be designed to bend for providing tension as) a grounding spring, for example, by bending a portion of the ESD shield 2301 around a device (e.g., any of the devices discussed herein) included in the junction box assembly. According to embodiments, a grounding spring (e.g., of the ESD shield 2301) may be constrained by a button base and plastic yolk parts.

Figure 25:
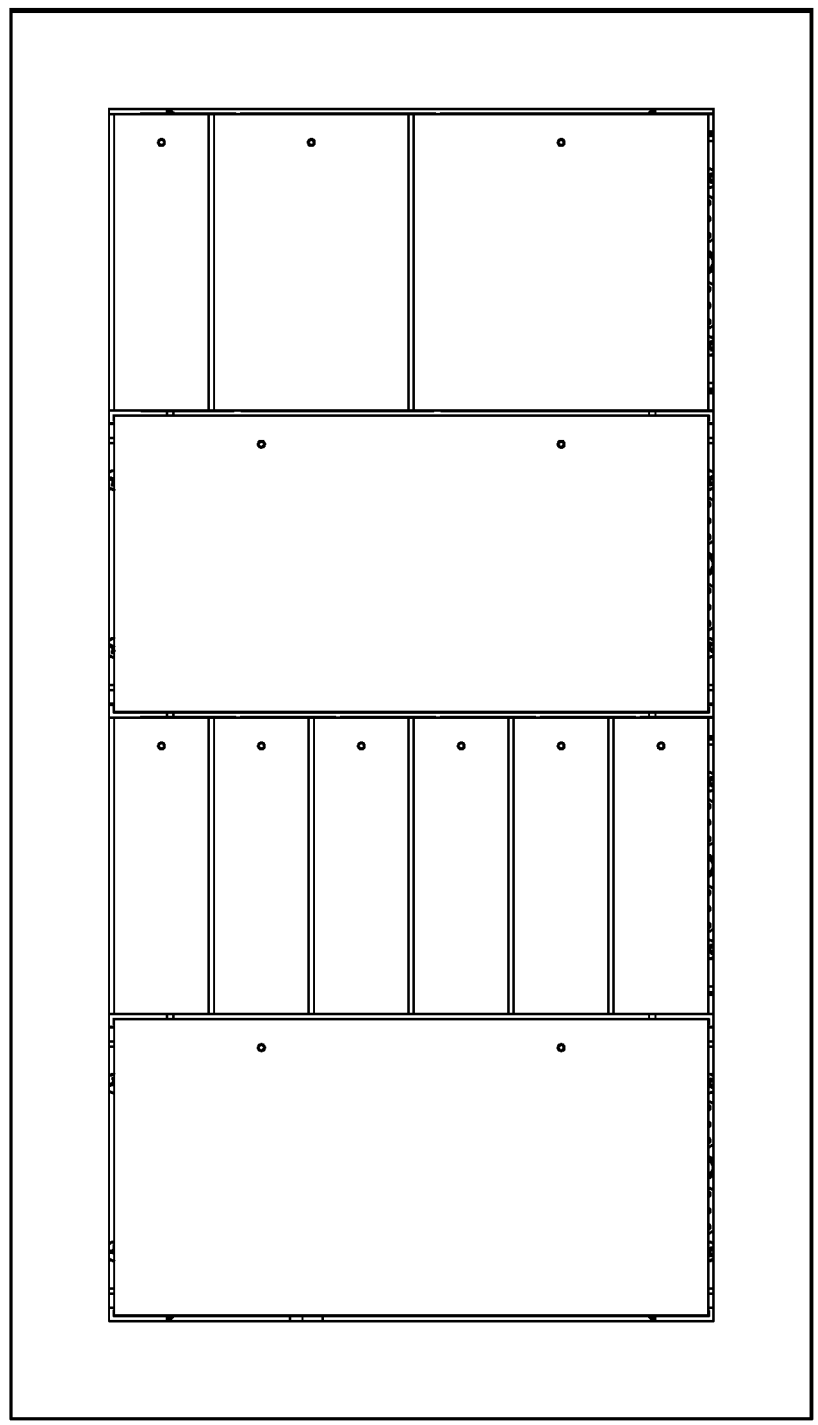
FIG. 25 is a diagram illustrating button configurability, according to embodiments.

FIG. 25 is a diagram illustrating button configurability, according to embodiments.

According to embodiments, a junction box assembly may include (e.g., provide) button configurability, for example, providing an increased number of button configurations and/or types of button configurations. According to embodiments, for example, in a case of center engraving of buttons, button configurability may be provided for a variety of button shapes and sizes, such as, for example, single high, double high, triple high, and rocker, and for example, six possible button positions, meaning that any of: 6 single high buttons, 3 double high, 2 triple high, or 1 rocker button may be used. According to embodiments, in a case of button configurability as discussed above, there may be a button size and/or type for an up/down action button, for example, that may be positioned (e.g., only used or usable) in the bottom most button position.

According to embodiments, a junction box assembly may include buttons having engraving at a center (e.g., a central and/or centralized location) of a button. That is, according to embodiments, a button may be engraved at a center of a button, for example, according to a backlighting design, for example, of the junction box assembly. According to embodiments, a button may block light (e.g., performs and/or operates as a light blocker), and in such a case, buttons of various sizes may have (e.g., include) center engraving. For example, in a case of buttons with mixed heights not having engraving at a center of the buttons, a 2-high button engraved text may not align with that of a 1-high button and/or a 3-high button. On the other hand, according to embodiments, in a case of a single large light guide window and light blocking horn between buttons, such allows for center engraving of buttons having different sizes, and/or engraving anywhere on the face of the buttons having different sizes.

According to embodiments, a junction box assembly may include large buttons, for example, such that device buttons included and/or installed in the junction box assembly may be actuated (e.g., may provide consistent actuation) by pressing any location on the top surface of the large button. According to embodiments, in a case of large buttons providing consistent actuation (e.g., across and/or at all corners), buttons may have a same and/or similar width while varying in length, for example, such that buttons are (e.g., all) 45.2 mm wide, and button heights may vary at any suitable ratio and/or spacing, such as: 14.4 mm, 29.7 mm, 44.9 mm, and 90.7 mm.

According to embodiments, as a first step, a metal base plate may be screwed into a junction box, and an earth ground may be attached (e.g., tied to, screwed to, connected to, attached to, etc., etc.) to the metal base plate. According to embodiments, the (e.g., one, singular, etc.) operation for attaching or tying the earth ground to the metal base plate may be the final and/or only grounding action for the junction box assembly, for example, because no further grounding wire attachments steps are needed for assembly of the junction box assembly. According to embodiments, as a second step, any number of devices may be installed and/or wired into the junction box assembly, and the devices may be connected (e.g., screwed) into a base plate. According to embodiments, as a third step, buttons may be installed and (e.g., subsequently) a magnetic face plate may be added and/or attached to the junction box assembly. According to embodiments, a junction box assembly method for installing and/or mounting a junction box assembly may have a feature of a base plate being installed first, for example, before devices (e.g., including 3rd party devices using the herein discussed device grounding method and/or system) and/or a sub-plate included in the junction box assembly.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The method(s) disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A junction box assembly including devices and components of the junction box assembly, the junction box assembly comprising:
    a junction box having an interior for containing any of devices and components included in the junction box assembly;
    a base plate having a central opening and a periphery attaching to the junction box;
    a grounding wire attached to the base plate;
    a device connected to the grounding wire and disposed in the central opening of the base plate;

a button array having any number of buttons and attaching to the device; and a face plate disposed to attach to the base plate and to surround the button array.

2. The junction box assembly of claim 1, wherein the base plate comprises an attachment feature that is molded element attaching the base plate to the grounding wire.

3. The junction box assembly of claim 1, wherein the button array comprises any type of buttons.

4. The junction box assembly of claim 3, wherein each of the buttons includes one or more light blocking horns.

5. The junction box assembly of claim 3, wherein each of the buttons includes more than two pivots.

6. The junction box assembly of claim 3, wherein one or more of the buttons has center engraving.

7. The junction box assembly of claim 1, wherein the button array is a light guide pipe guiding light through the junction box assembly.

8. The junction box assembly of claim 1, further comprising a light diffusion element for diffusing light within the junction box assembly.

9. The junction box assembly of claim 8, wherein the light diffusion element is a molded feature disposed on the button array.

10. The junction box assembly of claim 8, further comprising a controller configured to control a backlight of the electrical device based on a sensed measurement of the ambient light produced by the ambient light sensor.

* * * * *